(12) United States Patent
Takami et al.

(10) Patent No.: US 12,530,004 B2
(45) Date of Patent: Jan. 20, 2026

(54) APPARATUS, METHOD, AND COMPUTER READABLE MEDIUM

(71) Applicant: Yokogawa Electric Corporation, Tokyo (JP)

(72) Inventors: Go Takami, Tokyo (JP); Junji Yamamoto, Tokyo (JP); Keiichiro Kobuchi, Tokyo (JP); Hiroaki Kanokogi, Tokyo (JP); Yota Furukawa, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 459 days.

(21) Appl. No.: 17/970,556

(22) Filed: Oct. 20, 2022

(65) Prior Publication Data
US 2023/0126776 A1   Apr. 27, 2023

(30) Foreign Application Priority Data

Oct. 27, 2021 (JP) .................................. 2021-175652
Nov. 26, 2021 (JP) .................................. 2021-191945
Nov. 26, 2021 (JP) .................................. 2021-191964

(51) Int. Cl.
*G05B 13/04* (2006.01)
*G05B 13/02* (2006.01)

(52) U.S. Cl.
CPC ....... *G05B 13/041* (2013.01); *G05B 13/0265* (2013.01); *G05B 13/042* (2013.01); *G05B 13/048* (2013.01)

(58) Field of Classification Search
CPC .......................... G05B 13/041; G05B 13/0265; G05B 13/042; G05B 13/048; G05B 13/04;

(Continued)

(56) References Cited

U.S. PATENT DOCUMENTS 10,766,136 B1    9/2020  Porter
2007/0168057 A1* 7/2007 Blevins ................ G05B 13/048
                                                    700/53

(Continued)

FOREIGN PATENT DOCUMENTS

EP    2924570 A2    9/2015
EP    3828251 A1    6/2021

(Continued)

OTHER PUBLICATIONS

Extended European Search Report for International Application No. 22204153.5, issued by the European Patent Office on Feb. 28, 2023.

(Continued)

*Primary Examiner* — Christopher E. Everett

(57) ABSTRACT

Provided is an apparatus including a supply unit suppling a value of a state parameter to an operation model outputting a recommendation value of a control parameter of a piece of equipment in response to a value of a state parameter relating to the piece of equipment being input; a control parameter acquisition unit acquiring a recommendation value of a control parameter output from the operation model in response to the supply unit supplying a value of a state parameter to the operation model; an acquisition unit acquiring a model evaluation value corresponding to a result of having operated the piece of equipment according to the recommendation value acquired by the control parameter acquisition unit; and an evaluation unit evaluating the operation model, based on the model evaluation value and a reference evaluation value corresponding to a result of having operated the piece of equipment through manipulation by a human.

20 Claims, 10 Drawing Sheets

(58) Field of Classification Search
CPC .... G05B 19/41885; G05B 2219/31263; G05B 2219/32338; G05B 2219/32385; G05B 2219/33027; G05B 2219/35308; G05B 13/027; G05B 17/02; G06N 20/00
See application file for complete search history.

(56) References Cited

U.S. PATENT DOCUMENTS

| | | | |
|---|---|---|---|
| 2009/0119077 A1* | 5/2009 | Norman | G05B 17/02 703/6 |
| 2010/0070098 A1 | 3/2010 | Sterzing | |
| 2010/0114549 A1* | 5/2010 | Kolavi | H04L 41/145 715/854 |
| 2015/0277399 A1 | 10/2015 | Maturana | |
| 2016/0033962 A1* | 2/2016 | Cote | G05B 19/41885 700/29 |
| 2017/0003676 A1* | 1/2017 | Yoshida | G05B 19/4183 |
| 2017/0031343 A1 | 2/2017 | Hatanaka | |
| 2019/0018374 A1 | 1/2019 | Kaneki | |
| 2019/0258982 A1 | 8/2019 | Suzuki | |
| 2020/0057416 A1 | 2/2020 | Matsubara | |
| 2020/0070844 A1 | 3/2020 | Goto | |
| 2020/0293021 A1 | 9/2020 | Goya | |
| 2021/0157280 A1 | 5/2021 | Takami | |
| 2021/0264269 A1 | 8/2021 | Sato | |
| 2021/0397142 A1 | 12/2021 | Lovell | |
| 2022/0334553 A1 | 10/2022 | Shinozaki | |

FOREIGN PATENT DOCUMENTS

| | | |
|---|---|---|
| JP | 2017224027 A | 12/2017 |
| JP | 2018092511 A | 6/2018 |
| JP | 2019020885 A | 2/2019 |
| JP | 2019141869 A | 8/2019 |
| JP | 2020027556 A | 2/2020 |
| JP | 2021064049 A | 4/2021 |
| JP | 2021086283 A | 6/2021 |
| JP | 2021107962 A | 7/2021 |
| JP | 2021143882 A | 9/2021 |
| WO | 2019126755 A1 | 6/2019 |
| WO | 2021044899 A1 | 3/2021 |

OTHER PUBLICATIONS

Robert G. Sargent, Verification and validation of simulation models, Journal of simulation:JOS, Feb. 1, 2013, pp. 183-198, London.

Office Action issued for counterpart Japanese Application No. 2021-191945, transmitted from the Japanese Patent Office on Oct. 24, 2023 (drafted on Oct. 13, 2023).

Extended European Search Report for related European Application No. 22204147.7, issued by the European Patent Office on Feb. 28, 2023.

Office Action issued for related Japanese Application No. 2021-175652, transmitted from the Japanese Patent Office on Oct. 24, 2023 (drafted on Oct. 13, 2023).

Extended European Search Report for related European Application No. 22204158.4, issued by the European Patent Office on Mar. 1, 2023.

Go Takami, "AI-based Plant Control", Yokogawa Kibo, Yokogawa Electric Co., Ltd., 2020, vol. 63, No. 1, p. 33-36.

Takuji Imai, "Yokogawa Electric and NAIST realize advanced dml control with reinforcement learning for chemical plants and small number of trials", Nikkei Robotics , Nikkei BP, Inc., Mar. 2019, p. 22-25.

Office Action issued for related U.S. Appl. No. 17/970,544, issued by the US Patent and Trademark Office on Apr. 2, 2025.

Office Action issued for related U.S. Appl. No. 17/970,561, issued by the US Patent and Trademark Office on May 30, 2025.

Spielberg et al., "Deep Reinforcement Learning for Process Control: A Primer for Beginners," AIChE Journal, vol. 65, 1 dated No. 10, published 2019.

* cited by examiner

| TI001 | TI002 | TI003 | FI001 | FI002 | V001 | ACTION | WEIGHT |
|---|---|---|---|---|---|---|---|
| -2.47803 | -2.48413 | -0.07324 | 29.71191 | 24.2511 | 70 | 1 | 144.1484 |
| -2.48413 | -2.47803 | 2.972412 | 31.04248 | 27.4251 | 71 | -1 | -218.316 |
| -2.48413 | -2.48413 | 5.583271 | 31.88477 | 27.89047 | 70 | -1 | 117.1561 |
| -2.49023 | -2.48413 | 11.13281 | 32.71484 | 26.479 | 70 | 1 | -252.506 |
| -2.49634 | -2.48413 | 15.80811 | 33.48999 | 32.89337 | 74 | -3 | 82.16214 |
| -2.49023 | -2.48413 | 24.21265 | 33.97827 | 30.67796 | 68 | -3 | 154.4256 |
| -2.48413 | -2.48413 | 27.69775 | 32.06177 | 26.53965 | 64 | -3 | 156.0428 |
| -2.49023 | -0.37842 | 28.45459 | 30.33447 | 29.70328 | 66 | -3 | 75.27125 |
| -2.49023 | 4.937744 | 29.23584 | 29.93164 | 27.62347 | 64 | -1 | -491.443 |
| -1.5625 | 9.039307 | 28.79028 | 27.83203 | 19.13351 | 53 | -3 | -203.099 |
| -0.53711 | 10.47363 | 27.36206 | 25.67139 | 21.08102 | 51 | 3 | 198.1082 |
| 1.062012 | 12.18872 | 25.64087 | 25.36011 | 21.30703 | 57 | 0 | 278.2919 |
| 5.255127 | 15.14282 | 22.67456 | 26.09863 | 22.49868 | 57 | 1 | 76.35704 |
| 9.875488 | 17.77954 | 23.05908 | 28.6438 | 22.48553 | 64 | -3 | 262.9233 |

| TI001 | TI002 | TI003 | FI001 | FI002 | V001 | ACTION |
|---|---|---|---|---|---|---|
| 0.1 | 0.2 | 0.4 | 0.3 | 0.8 | 0.2 | -3 |
| 0.1 | 0.2 | 0.4 | 0.3 | 0.8 | 0.2 | -1 |
| 0.1 | 0.2 | 0.4 | 0.3 | 0.8 | 0.2 | 0 |
| 0.1 | 0.2 | 0.4 | 0.3 | 0.8 | 0.2 | 1 |
| 0.1 | 0.2 | 0.4 | 0.3 | 0.8 | 0.2 | 3 |

FIG.3

APPARATUS, METHOD, AND COMPUTER READABLE MEDIUM

The contents of the following Japanese patent application(s) are incorporated herein by reference:
 2021-175652 filed in JP on Oct. 27, 2021
 2021-191945 filed in JP on Nov. 26, 2021
 2021-191964 filed in JP on Nov. 26, 2021

BACKGROUND

1. Technical Field

The present invention relates to an apparatus, a method and a computer readable medium.

2. Related Art

Patent Document 1 discloses "performing learning processing of a first model configured to output a recommended control parameter representing a first type of control content recommended so as to increase a reward value that is determined by a preset reward function, in response to an input of measurement data".

PRIOR ART DOCUMENT

Patent Document

[Patent Document 1] Japanese Patent Application Publication No. 2021-086283
[Patent Document 2] Japanese Patent Application Publication No. 2020-027556
[Patent Document 3] Japanese Patent Application Publication No. 2019-020885

Non-Patent Document

[Non-Patent Document 1] Go Takami, "Realization of Plant Control AI", Yokogawa Kibo, Yokogawa Electric Co., Ltd., 2020, Vol. 63, No. 1, p. 33-36
[Non-Patent Document 2] Takuji Imai, "Yokogawa Electric and NAIST realize advanced dml control with reinforcement learning for chemical plants and small number of trials", Nikkei Robotics, Nikkei BP, Inc., March 2019 issue

SUMMARY

A first aspect of the present invention provides an apparatus. The apparatus may include a supply unit configured to supply a value of a state parameter to an operation model configured to output a recommendation value of a control parameter of a piece of equipment in response to a value of a state parameter relating to the piece of equipment being input. The apparatus may include a control parameter acquisition unit configured to acquire a recommendation value of a control parameter that is output from the operation model in response to the supply unit supplying a value of a state parameter to the operation model. The apparatus may include an acquisition unit configured to acquire a model evaluation value corresponding to a result of having operated the piece of equipment according to the recommendation value acquired by the control parameter acquisition unit. The apparatus may include an evaluation unit configured to evaluate the operation model, based on the model evaluation value and a reference evaluation value corresponding to a result of having operated the piece of equipment through a manipulation by a human.

A second aspect of the present invention provides a method. The method may include a supplying step of supplying a value of a state parameter to an operation model configured to output a recommendation value of a control parameter of a piece of equipment, in response to a value of a state parameter representing a state relating to the piece of equipment being input. The method may include a control parameter acquiring step of acquiring a recommendation value of a control parameter that is output from the operation model in response to supplying a value of a state parameter to the operation model by the supplying step. The method may include an acquiring step of acquiring a model evaluation value corresponding to a result of having operated the piece of equipment according to the recommendation value acquired by the control parameter acquiring step. The method may include an evaluating step of evaluating the operation model, based on the model evaluation value and a reference evaluation value corresponding to a result of having operated the piece of equipment through a manipulation by a human.

A third aspect of the present invention provides a computer readable medium having recorded thereon a program. The program may be configured to cause a computer to function as a supply unit configured to supply a value of a state parameter to an operation model configured to output a recommendation value of a control parameter of a piece of equipment in response to the value of the state parameter relating to the piece of equipment being input. The program may be configured to cause the computer to function as a control parameter acquisition unit configured to acquire a recommendation value of a control parameter that is output from the operation model in response to the supply unit supplying a value of a state parameter to the operation model. The program may be configured to cause the computer to function as an acquisition unit configured to acquire a model evaluation value corresponding to a result of having operated the piece of equipment according to the recommendation value acquired by the control parameter acquisition unit. The program may be configured to cause the computer to function as an evaluation unit configured to evaluate an operation model, based on the model evaluation value and a reference evaluation value corresponding to a result of having operated the piece of equipment through a manipulation by a human.

Note that the summary clause does not necessarily describe all necessary features of the embodiments of the present invention. The present invention may also be a sub-combination of the features described above.

BRIEF DESCRIPTION OF THE DRAWINGS

FIG. 2 shows a data structure of an operation model 401.
FIG. 3 shows an action decision table.

DESCRIPTION OF EXEMPLARY EMBODIMENTS

Hereinafter, the present invention will be described through embodiments of the invention, but the following embodiments do not limit the invention according to the claims. In addition, not all combinations of features described in the embodiments necessarily have to be essential to solving means of the invention.

1. System

Figure 1:
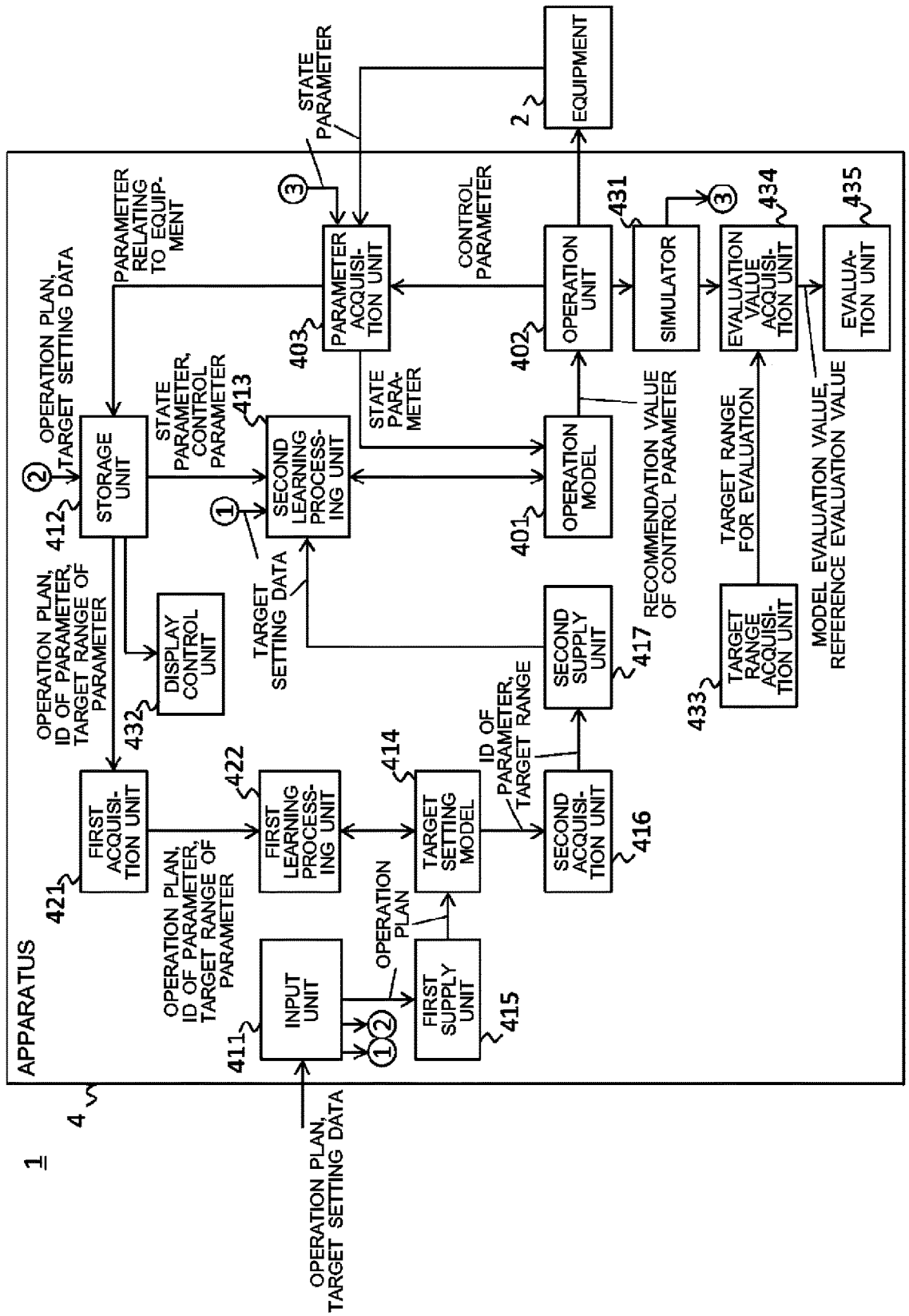
FIG. 1 shows a system 1 according to an embodiment.

FIG. 1 shows a system 1 according to the present embodiment. The system 1 includes a piece of equipment 2 and an apparatus 4. Note that, the blocks in the drawing are functional blocks that are each functionally divided, and may not be necessarily required to be matched with actual apparatus configurations. That is, in the present drawing, an apparatus indicated by one block may not be necessarily required to be configured by one apparatus. In addition, in the present drawing, apparatuses indicated by separate blocks may not be necessarily required to be configured by separate apparatuses.

[1.1. Equipment 2]

The piece of equipment 2 is a facility, an apparatus, or the like in which one or more devices (not shown) are equipped. For example, the piece of equipment 2 may be a plant or a complex apparatus in which a plurality of devices is combined. Examples of the plant may include a plant for managing and controlling wells such as a gas field and an oilfield and surroundings thereof, a plant for managing and controlling hydroelectric, thermo electric and nuclear power generations and the like, a plant for managing and controlling environmental power generation such as solar power and wind power, a plant for managing and controlling water and sewerage, a dam and the like, and the like, in addition to chemical and bio industrial plants and the like.

Each device is a mechanism, a machine, or an apparatus, and may be, for example, an actuator such as a valve, a pump, a heater, a fan, a motor or a switch, which controls at least one physical quantity such as a pressure, a temperature, pH, a speed, and a flow rate in a process of the piece of equipment 2. The respective devices may be of different types from each other, and at least two or more devices as a part of the devices may be of the same type. Each device may be controlled in a wired or wireless manner by the apparatus 4.

The piece of equipment 2 may be provided with one or more sensors (not shown). Each sensor is configured to measure or discriminate a state relating to the piece of equipment 2. Each sensor may also be configured to measure or discriminate an operation state, such as a production volume of the piece of equipment 2, a ratio of mixed impurities, an operating situation of each controlled object, and an alarm occurrence situation. An operating situation of a device may be expressed by, for example, at least one physical quantity such as a pressure, a temperature, pH, a speed, and a flow rate, which are controlled by the device. Each sensor may be configured to supply a result of the measurement or discrimination to the apparatus 4.

[1.2. Apparatus 4]

The apparatus 4 may be one configured to operate the piece of equipment 2 by using an operation model 401 configured to operate the piece of equipment 2, and may include the operation model 401, an operation unit 402, and a parameter acquisition unit 403. In addition, the apparatus 4 may be one configured to perform learning processing of the operation model 401, and may include an input unit 411, a storage unit 412, a second learning processing unit 413, a target setting model 414, a first supply unit 415, a second acquisition unit. 416, and a second supply unit 417. Further, the apparatus 4 may be one configured to perform learning processing of the target setting model 414, and may include a first acquisition unit 421 and a first learning processing unit 422. Further, the apparatus 4 may be one configured to evaluate the operation model 401, and may include a simulator 431, a display control unit 432, a target range acquisition unit 433, an evaluation value acquisition unit 434, and an evaluation unit 435.

[1.2.1. Operation Model 401]

The operation model 401 is a model for operating the piece of equipment 2. The operation model 401 may be configured to output a recommendation value of a control parameter of the piece of equipment 2, in response to a value of a state parameter relating to the piece of equipment 2 being input. The operation model 401 may be configured to supply the control parameter to the operation unit 402.

The operation model 401 may be configured to output a recommendation value of a control parameter causing a state relating to the piece of equipment 2 closer to a state corresponding to a content of target setting data used for learning of the operation model 401, in response to a value of the state parameter being input. The target setting data may include identification information of a parameter for which a target range is to be set among parameters relating to the piece of equipment 2, and a target range that is set for the parameter. The target setting data may include only one combination of the identification information and the target range of the parameter, or may include a plurality of the combinations.

The parameter relating to the piece of equipment 2 may include a state parameter relating to the piece of equipment 2 and a control parameter of the piece of equipment 2. The state parameter relating to the piece of equipment 2 may include a state parameter of the piece of equipment 2, and a state parameter (also referred to as a performance parameter) of a product resulting from an operation of the piece of equipment 2. The state parameter of the piece of equipment 2 may be, for example, a pressure, a flow rate, a temperature, pH, a speed, power consumption, a concentration, or the like. The state parameter of the piece of equipment 2 may be a parameter relating to energy consumption of the piece of equipment 2, a parameter relating to a discharge amount of a greenhouse gas, or a parameter relating to a yield. The state parameter of the product may be, for example, an index value representing a quality (also referred to as a quality value), a production volume, or the like. The quality value may be a value representing, for example, a purity, a concentration, a composition, a viscosity, a color, or the like of the product. The control parameter may be, for example, a manipulated variable of a valve. Note that, in the present embodiment, as an example, the parameter for which a target range is to be set may be the state parameter relating to the piece of equipment 2.

[1.2.2. Operation Unit 402]

The operation unit 402 is configured to operate the piece of equipment 2 by using the operation model 401. The operation unit 402 may be an example of the control parameter acquisition unit, and may be configured to acquire a recommendation value of the control parameter that is output from the operation model 401 in response to the parameter acquisition unit 403 described later supplying the value of the state parameter to the operation model 401. The operation unit 402 may be configured to operate the piece of equipment 2 by controlling each device of the piece of equipment 2 by using the control parameter that is output from the operation model 401. The operation unit 402 may be configured to supply, to the simulator 431, the recommendation value of the control parameter output from the operation model 401, and to cause the simulator to simulate an operation of the piece of equipment 2.

Note that, the operation unit 402 may be configured to operate the piece of equipment 2, in response to a manipulation by a human input via the input unit 411. The operation unit 402 may be configured to supply, to the simulator 431, a control parameter corresponding to the manipulation by a human, and to cause the simulator to simulate an operation of the piece of equipment 2.

[1.2.3. Parameter Acquisition Unit 403]

The parameter acquisition unit 403 is configured to acquire a parameter relating to the piece of equipment 2. The parameter acquisition unit 403 may be configured to acquire the control parameter of the piece of equipment 2 from the operation unit 402. The parameter acquisition unit 403 may be configured to acquire, from the piece of equipment 2, the state parameter relating to the piece of equipment 2 (the state parameter of the product and the state parameter of the piece of equipment 2, as an example, in the present embodiment). However, the parameter acquisition unit 403 may also be configured to acquire the control parameter of the piece of equipment 2 from the piece of equipment 2, and to acquire the state parameter of the product from an operator. In addition, when the simulation of the piece of equipment 2 is performed by the simulator 431, the parameter acquisition unit 403 may be configured to acquire the state parameter relating to the piece of equipment 2 among the parameters relating to the simulated equipment 2, from the simulator 431.

The parameter acquisition unit 403 may be configured to store each of the acquired parameters in the storage unit 412. The parameter acquisition unit 403 may be an example of the supply unit, and may be configured to supply a value of the state parameter to the operation model 401.

[1.2.4. Input Unit 411]

The input unit 411 is configured to receive various input manipulations from an operator. The input unit 411 may be configured to receive an input manipulation of an operation plan of the piece of equipment 2 from the operator. In addition, the input unit 411 may be configured to receive an input manipulation of the target setting data from the operator. When the learning processing of the target setting model 414 is not completed, the operation plan and the target setting data may be input associated with each other.

Here, the operation plan of the piece of equipment 2 may represent at least one of a planned production volume, a target quality, or a material type of an article that is produced by the piece of equipment 2. The operation plan of the piece of equipment 2 may represent other contents, such as energy efficiency, power consumption, a yield, and a discharge amount of a greenhouse gas of the piece of equipment 2.

The input unit 411 may be configured to store the input operation plan and target setting data in the storage unit 412. The input unit 411 may be configured to supply the input target setting data to the second learning processing unit 413. The input unit 411 may be configured to supply the input operation plan to the first supply unit 415.

[1.2.5. Storage Unit 412]

The storage unit 412 is configured to store a variety of data. The storage unit 412 may be configured to store each parameter acquired by the parameter acquisition unit 403. In addition, the storage unit 412 may be configured to store the target setting data and the operation plan of the piece of equipment 2 input by the input unit 411. The target setting data stored in the storage unit 412 may be data used for learning of the operation model 401, and may be, as an example, data set by a veteran operator. Note that, when an operation plan is supplied to the target setting model 414 to be described later and target setting data is generated, the storage unit 412 may be configured to further store the target setting data and the operation plan. The data stored in the storage unit 412 may be used for learning processing by the first learning processing unit 422 and the second learning processing unit 413.

[1.2.6. Second Learning Processing Unit 413]

The second learning processing unit 413 is configured to execute learning processing of the operation model 401 so as to output a recommendation value of a control parameter in response to a value of the state parameter being input, by using learning data including the value of the state parameter relating to the piece of equipment 2 and the value of the control parameter of the piece of equipment 2. The types of the state parameter and the control parameter included in the learning data that is used by the second learning processing unit 413 may be arbitrarily selected by the operator, from among the parameters acquired by the parameter acquisition unit 403.

The second learning processing unit 413 may be configured to perform the learning processing of the operation model 401 by reinforcement learning. For example, the second learning processing unit 413 may be configured to perform the learning processing of the operation model 401 by using the learning data and a reward value determined by a preset reward function.

The second learning processing unit 413 may be configured to perform the learning processing of the operation model 401 by further using the target setting data, and to perform, in response to a value of the state parameter being input, the learning processing so as to output a value of a control parameter causing a state relating to the piece of equipment 2 closer to a state corresponding to a content of the target setting data. In this case, the second learning processing unit 413 may be configured to perform the learning processing by using a reward value that is determined by a reward function set based on the content of the target setting data.

For example, the reward function may be a function that sets a reward value to 1 when a value of the state parameter relating to the piece of equipment 2 operated using the control parameter output from the operation model 401 satisfies the content of the target setting data, and sets a reward value to 0 when a value of the state parameter does not satisfy the content of the target setting data. In addition, the reward function may be a function that varies a reward value, according to a degree that a value of the state parameter relating to the piece of equipment 2 operated using the control parameter output from the operation model 401 deviates from a target range of the target setting data. As an example, the reward function may be a function represented by a following formula (1).

$$\text{reward value} = a * \text{energy saving index} - b * \text{degree of deviation of quality value} \quad (1)$$

Note that, "a" and "b" in formula (1) may be coefficients. The "energy saving index" is an index representing a degree of energy saving of the piece of equipment 2, and may be a value calculated from the state parameter of the piece of equipment 2. The "degree of deviation of the quality value" may be such a magnitude that a quality value of a product deviates from a target range of the quality value in the target setting data.

[1.2.7. Target Setting Model 414]

The target setting model 414 is configured to output at least one of identification information or the target range of a parameter among the target setting data that should be used for learning of the operation model 401, in response to an operation plan being input. In the present embodiment, as an example, the target setting model 414 may be configured to output both the identification information and the target range of the parameter. The target setting model 414 may be configured to output only one combination of the identification information and the target range of the parameter, or may be configured to output a plurality of combinations thereof.

[1.2.8. First Supply Unit 415]

The first supply unit 415 is configured to supply, in response to an operation plan of the piece of equipment 2 being input, the operation plan to the target setting model 414. In response to an operation plan being newly input to the input unit 411, the first supply unit 415 may be configured to supply the new operation plan to the target setting model 414. Thereby, data corresponding to the operation plan is output from the target setting model 414.

[1.2.9. Second Acquisition Unit 416]

The second acquisition unit 416 is configured to acquire output data from the target setting model 414 supplied with the operation plan by the first supply unit 415. In the present embodiment, as an example, the second acquisition unit 416 may be configured to acquire both the identification information and the target range of the parameter from the target setting model 414, as output data. The second acquisition unit 416 may be configured to supply the acquired output data to the second supply unit 417.

[1.2.10. Second Supply Unit 417]

The second supply unit 417 is configured to supply, to the second learning processing unit 413, the target setting data corresponding to the output data acquired by the second acquisition unit 416. Thereby, the learning processing of the operation model 401 is performed using the target setting data supplied from the second supply unit 417.

Note that, in the present embodiment, as an example, the output data from the target setting model 414 includes both the identification information and the target range of the parameter. For this reason, the second supply unit 417 may be configured to supply the output data, as it is, to the operation model 401, as target setting data.

[1.2.11. First Acquisition Unit 421]

The first acquisition unit 421 is configured to acquire the operation plan of the piece of equipment 2, and at least the identification information of the parameter among the target setting data used for learning of the operation model 401. In the present embodiment, as an example, the first acquisition unit 421 may be configured to acquire both the identification information and the target range of the parameter among the target setting data. The first acquisition unit 421 may be configured to supply the acquired data to the first learning processing unit 422.

[1.2.12. First Learning Processing Unit 422]

The first learning processing unit 422 is configured to perform learning processing of the target setting model 414 by using the learning data including the identification information of the parameter and the operation plan acquired by the first acquisition unit 421.

Although the first learning processing unit 422 is configured to perform the learning processing of the target setting model 414 by supervised learning such as deep learning, the first learning processing unit may also be configured to perform learning of the target setting model 414 by another machine learning method. For example, the first learning processing unit 422 may be configured to perform the learning processing of the target setting model 414 by using learning data including the identification information of the parameter in the target setting data used for learning of the operation model 401, and the operation plan input in association with the target setting data. In the present embodiment, as an example, the first learning processing unit 422 may be configured to perform the learning processing of the target setting model 414 by using learning data including the identification information of the parameter in the target setting data set by a veteran operator and used for learning of the operation model 401, and the operation plan input in association with the target setting data.

The first learning processing unit 422 may be configured to perform learning processing of the target setting model 414 so that a content of the output data from the target setting model 414 approximates a content of the target setting data used for learning of the operation model 401. In addition, the first learning processing unit 422 may be configured to perform, in response to an operation plan being input, learning processing for the target setting model 414 so as to output the identification information or the target range of the parameter in the target setting data, which should be used for learning of the operation model 401 so as to implement the operation plan.

The first learning processing unit 422 may be configured to perform learning processing of the target setting model 414 by using the learning data further including the target range of the parameter acquired by the first acquisition unit 421. That is, the first learning processing unit 422 may be configured to perform learning processing of the target setting model 414 by using the learning data including the identification information and the target range of the parameter in the target setting data used for learning of the operation model 401. The first learning processing unit 422 may be configured to perform, in response to an operation plan being input, learning processing for the target setting model 414 so as to output both the identification information and the target range of the parameter among the target setting data, which should be used for learning of the operation model 401 so as to implement the operation plan.

[1.2.13. Simulator 431]

The simulator 431 is configured to simulate a state of the piece of equipment 2. The simulator 431 may be a dynamic simulator configured to dynamically simulate a state from a steady state of the piece of equipment 2 to a stop, or a static simulator configured to simulate a steady state of the piece of equipment 2.

The simulator 431 may be configured to simulate a state relating to the piece of equipment 2 operated based on a value of the control parameter supplied from the operation unit 402. The value of the control parameter supplied from the operation unit 402 may be a recommendation value of the control parameter output from the operation model 401, or a control parameter corresponding to a manipulation by a human. The simulator 431 may be configured to supply a parameter relating to the piece of equipment 2 operated in the simulation (a state parameter relating to the piece of equipment 2, as an example, in the present embodiment) to the evaluation value acquisition unit 434 and the parameter acquisition unit 403.

[1.2.14. Display Control Unit 432]

The display control unit 432 is configured to cause various information to be displayed on a display apparatus (not shown). For example, the display control unit 432 may be configured to cause the identification information and the target range of the parameter acquired from the target setting model 414 by the second acquisition unit 416 to be displayed. In addition, the display control unit 432 may be configured to read out, from the storage unit 412, each parameter acquired by the parameter acquisition unit 403 and to cause the same to be displayed. The display control unit 432 may be configured to cause, in response to any parameter (also referred to as a selection parameter) being selected from a plurality of types of parameters relating to the piece of equipment 2 by an operator, a value of the selection parameter in a past operation of the piece of equipment 2 to be displayed.

Note that, when the piece of equipment 2 manufactures an article, in the display control unit 432, and the target range acquisition unit 433, the evaluation value acquisition unit 434 and the evaluation unit 435, which will be described later, the parameter relating to the piece of equipment 2 may be a state parameter relating to a product, and may be, as an example in the present embodiment, at least one of an index value representing a quality of the product or a production volume of the product. In addition to or instead of this, the parameter relating to the piece of equipment 2 may be a state parameter of the piece of equipment 2 (as an example, energy efficiency, power consumption or the like of the piece of equipment 2) or a control parameter of the piece of equipment 2.

[1.2.15. Target Range Acquisition Unit 433]

The target range acquisition unit 433 is configured to acquire a target range (also referred to as a target range for evaluation) that is set by the operator so as to evaluate the operation model 401 with respect to the selection parameter selected by the operator. For example, the target range acquisition unit 433 may be configured to acquire the target range for evaluation that is set by the operator based on a value in the past operation displayed with respect to each selection parameter by the display control unit 432. The target range acquisition unit 433 may be configured to supply the acquired target range for evaluation to the evaluation value acquisition unit 434.

Note that, the target range for evaluation may be the same as or different from the target range in the target setting data used for learning of the operation model 401. In addition, the parameter for which the target range for evaluation is set may be the same as or different from the parameter in the target setting data used for learning of the operation model 401.

[1.2.16. Evaluation Value Acquisition Unit 434]

The evaluation value acquisition unit 434 is configured to acquire a model evaluation value corresponding to a result of having operated the piece of equipment 2 by the recommendation value acquired from the operation model 401 by the operation unit 402. The evaluation value acquisition unit 434 may be configured to supply the acquired model evaluation value to the evaluation unit 435.

The model evaluation value may be an evaluation value for evaluating the operation model 401. In the present embodiment, as an example, the model evaluation value may be calculated based on whether the parameter relating to the piece of equipment 2 operated by the recommendation value output from the operation model 401 falls within the target range for evaluation. Note that, the model evaluation value may be the same as or different from the reward value that is used in the reinforcement learning of the operation model 401 by the second learning processing unit 413.

In addition, the evaluation value acquisition unit 434 may be configured to further acquire a reference evaluation value corresponding to a result of having operated the piece of equipment 2 by a manipulation by a human (for example, manipulation by a veteran operator). The evaluation value acquisition unit 434 may be configured to supply the acquired reference evaluation value to the evaluation unit 435.

The reference evaluation value may be a reference value of the model evaluation value. The reference evaluation value may be calculated similarly to the model evaluation value, based on whether the parameter relating to the piece of equipment 2 operated through the manipulation by a human falls within the target range.

[1.2.17. Evaluation Unit 435]

The evaluation unit 435 is configured to evaluate the operation model 401, based on the model evaluation value and the reference evaluation value. The evaluation unit 435 may be configured to evaluate the operation model 401, based on a comparison result of the model evaluation value and the reference evaluation value. For example, when the model evaluation value is a more favorable value than the reference evaluation value, the evaluation unit 435 may be configured to perform evaluation to the effect that the operation model 401 is favorable. The evaluation unit 435 may be configured to output the evaluation result to the display control unit 432 or the like.

According to the apparatus 4 described above, the target setting model 414 is configured to output at least one of the identification information or the target range of the parameter among the target setting data that should be used for learning of the operation model 401, in response to an operation plan being input. In addition, the learning processing of the target setting model 414 is performed using the learning data including the operation plan of the piece of equipment 2 and at least the identification information of the parameter among the target setting data used for learning of the operation model 401. Therefore, the content of the output data from the target setting model 414 (here, at least one of the identification information or the target range of the parameter) can be approximated to the content of the target setting data used for learning of the operation model 401 so as to implement the operation plan. Therefore, by performing the learning processing of the operation model 401 by using the output data from the target setting model 414, it is possible to generate the operation model 401 that performs an appropriate operation corresponding to an operation plan.

Further, the learning processing of the operation model 401 is performed using the target setting data, in response to a value of the state parameter being input, so as to output a value of the control parameter causing a state relating to the piece of equipment 2 closer to a state corresponding to the content of the target setting data. Therefore, it is possible to generate the operation model 401 configured to perform operation of the piece of equipment 2 in an appropriate operation state.

Further, in response to a new operation plan being input, the operation plan is supplied to the target setting model 414, and the learning processing of the operation model 401 is performed using the target setting data corresponding to the output data from the target setting model 414. Therefore, whenever an operation plan is changed, the learning processing of the operation model 401 is performed using the target setting data corresponding to the operation plan, and the operation model 401 configured to perform an appropriate operation corresponding to the operation plan can be generated.

Further, the operation model 401 is evaluated based on the model evaluation value corresponding to the result of having operated the piece of equipment 2 by the recommendation value of the control parameter output from the operation model 401, and the reference evaluation value corresponding to the result of having operated the piece of equipment 2 through the manipulation by a human. Therefore, it is possible to uniformly judge whether the operation result by using the operation model 401 is good or bad, and furthermore, whether the operation model 401 is good or bad.

Further, the model evaluation value is calculated based on whether the parameter relating to the piece of equipment 2 operated by the recommendation value of the control parameter output from the operation model 401 falls within the target range for evaluation of the operation model 401, and the reference evaluation value is calculated based on whether the parameter relating to the piece of equipment 2 operated through the manipulation by a human falls within the target range for evaluation. Therefore, it is possible to judge further uniformly whether the operation result by using the operation model 401 is good or bad.

In addition, since the target range for evaluation set by the operator is acquired for the selection parameter selected by the operator among the plurality of types of parameters relating to the piece of equipment 2, it is possible to set an arbitrary target range for evaluation for any parameter. Therefore, it is possible to arbitrarily set an evaluation criterion of the operation result.

Further, in response to a selection parameter being selected from the plurality of types of parameters, the value of the selection parameter in the past operation of equipment 2 is displayed. Therefore, it is possible to set the target range for evaluation, based on the past value of the selection parameter.

Further, in the evaluation of the operation model 401, since the parameter relating to the piece of equipment 2 is at least one of an index value representing a quality of the product by the piece of equipment 2 or a production volume of the product, it is possible to acquire an evaluation result that the operation model 401 in which the production volume or the quality is improved is set as a favorable operation model 401. Therefore, it is possible to improve the production volume and the quality by using the operation model 401 having high evaluation.

Further, since the learning processing of the operation model 401 is executed by the second learning processing unit 413 by using the learning data including the value of the state parameter and the value of the control parameter, the learning processing is performed on an operation model 401 having low evaluation, so that an operation model 401 having high evaluation can be obtained.

Further, since the learning processing of the operation model 401 is executed using the learning data and the reward value determined by the preset reward function, it is possible to securely obtain the operation model 401 having high evaluation.

2. Operation Model 401

FIG. 2 shows a data structure of the operation model 401. The operation model 401 has a data structure configured by a combination (s, a) of a state s representing a set of sampled state data and an action a taken under each state, and a weight w calculated by a reward. Note that, such a weight may be decided based on a reward determined by a reward function using the target setting data. In this drawing, as an example, a case where the state s=(TI001, TI002, TI003, FI001, FI002, VI001) is shown. In this drawing, for example, when an action of a=1 is taken under the state of s=(−2.47803, −2.48413, −0.07324, 29.71191, 24.2511, 70), it means that the weight calculated by the reward is w=144.1484. A next action is decided by such operation model 401.

FIG. 3 shows an action decision table. The action decision table is configured by an input state s and an action a that can be taken. In this drawing, as an example, the input state is s=(0.1, 0.2, 0.4, 0.3, 0.8, 0.2), and the action that can be taken is five cases of a=(−3, −1, 0, 1, 3). For example, a next action is decided by inputting such action decision table to the operation model 401 shown in FIG. 4. This will be described in detail by using a flow.

3. Operation of Apparatus 4

[3.1. Learning Operation of Operation Model 401]

Figure 4:
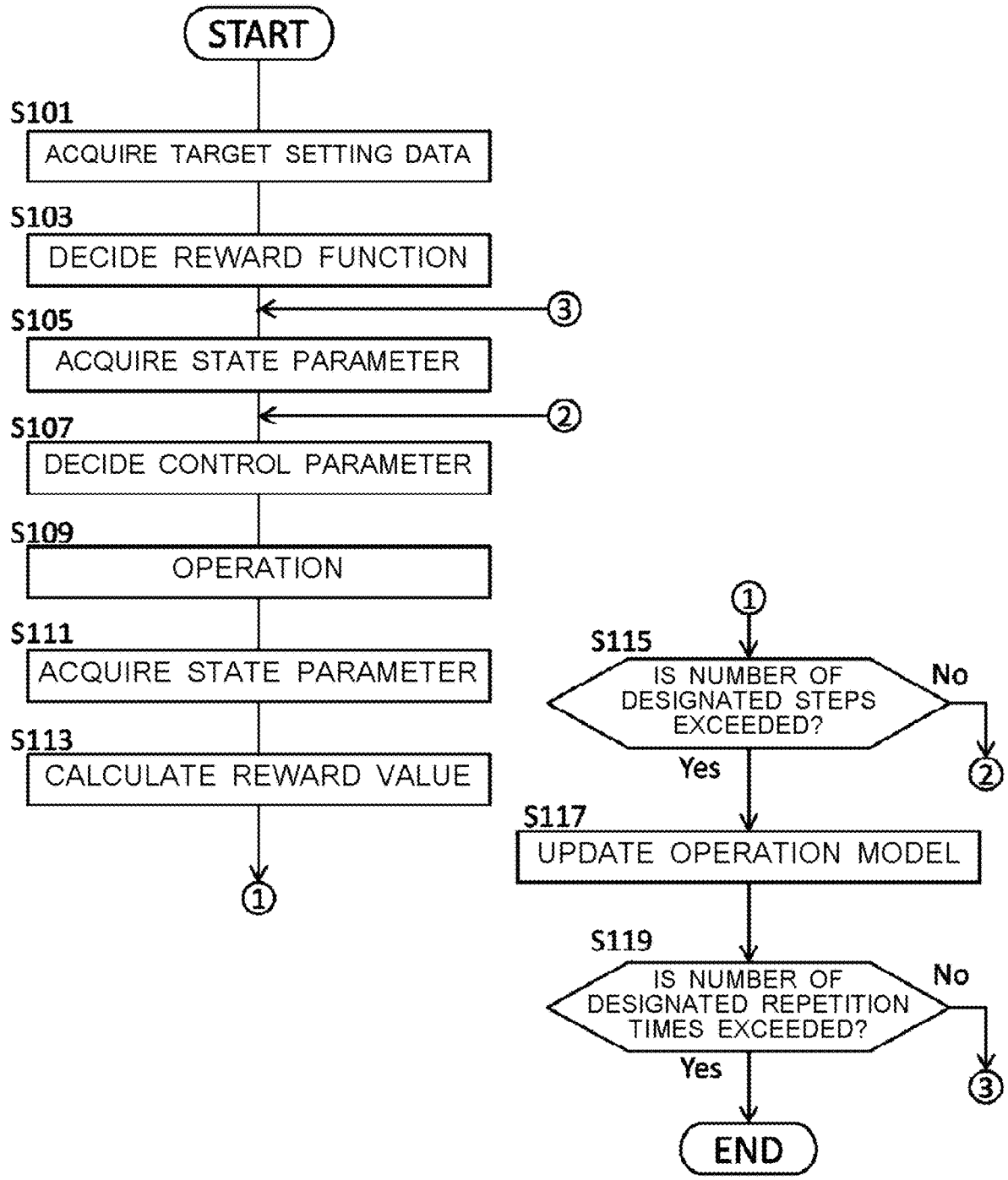
FIG. 4 shows a learning operation of the operation model 401.

FIG. 4 shows a learning operation of the operation model 401. The apparatus 4 may generate the operation model 401 by processing of steps S101 to S119.

In step S101, the second learning processing unit 413 acquires target setting data. In the operation of this drawing, the second learning processing unit 413 may acquire the target setting data including identification information of a parameter input via the input unit 411 and a target range of the parameter.

Note that, in step S101, the display control unit 432 may cause a content of the target setting data previously used in learning of the operation model 401 to be displayed. For example, the display control unit 432 may cause, in response to any of a plurality of types of parameters relating to the piece of equipment 2 being selected as a setting object of the target range by the operator, a target range previously set for the parameter to be displayed. In addition, the display control unit 432 may further cause at least a part of an area included in the previously set target range to be displayed as a recommended target range. For example, the display control unit 432 may cause a range of a central portion of a pre-designated ratio of the previously set target range to be displayed as the recommended target range. As an example, when the target range previously set for a parameter Pa is 5 to 15, the target range previously set for a parameter Pb is 10 to 30, and the designated ratio is 90%, the display control unit 432 may set the recommended target range for the parameter Pa to 6 to 14, and the recommended target range for the parameter Pb to 12 to 28.

The display control unit 432 may cause the previously set target range to be displayed in a coordinate space in which each parameter of the setting object of the target range is set as a coordinate axis. In addition, the display control unit 432 may further cause the recommended target range to be displayed in the coordinate space. When the previously set target range is displayed in the coordinate space, the second learning processing unit 413 may acquire, in response to a range designation being performed in the coordinate space by the input unit 411, the designated range as the target range.

In step S103, the second learning processing unit 413 decides a reward function by using the target setting data. The second learning processing unit 413 may decide the reward function so that a reward value becomes higher when the state relating to the piece of equipment 2 operated by the operation model 401 comes closer to a state corresponding to the content of the target setting data. In addition, the second learning processing unit 413 may decide the reward function so that a reward value becomes high when the state parameter relating to the piece of equipment 2 operated by the operation model 401 satisfies the content of the target setting data.

In step S105, the parameter acquisition unit 403 acquires a state parameter relating to the piece of equipment 2. For example, the parameter acquisition unit 403 may acquire the state parameter from the piece of equipment 2 or the simulator 431.

In step S107, the second learning processing unit 413 decides an action, and decides a control parameter corresponding to the decided action. For example, the second learning processing unit 413 randomly decides an action. Note that, in the above description, the case where the second learning processing unit 413 randomly decides an action has been shown as an example. However, it is not limited thereto. For example, a known AI algorithm such as FKDPP (Factorial Kernel Dynamic Policy Programming) may be used at the time when the second learning processing unit 413 decides an action. When using such a kernel method, the second learning processing unit 413 generates a vector of the state s from the state data. Next, the second learning processing unit 413 generates a combination of the state s and all the actions a that can be taken, as the action decision table as shown in FIG. 3, for example. Then, the second learning processing unit 413 inputs the action decision table to the operation model 401 as shown in FIG. 2, for example. In response to this, a kernel calculation between each row of the action decision table and each sample data except the weight column in the operation model 401 is performed, and a distance with each sample data is calculated, respectively. Then, values obtained by multiplying each value of the weight column by the distance calculated with respect to each sample data are sequentially added, and a reward expectation value in each action is calculated. The operation model 401 selects an action with the highest reward expectation value calculated in this way. In this way, for example, the second learning processing unit 413 may decide an action by selecting the action judged to have the highest reward expectation value by using the operation model under update. At the time of learning, the second learning processing unit 413 may decide an action while appropriately selecting whether to decide an action at random or to decide an action by using the operation model 401. The second learning processing unit 413 supplies the control parameter corresponding to the decided action to the operation unit 402.

In step S109, the operation unit 402 operates the piece of equipment 2 according to the supplied control parameter. The operation unit 402 may cause the simulator 431 to perform a simulation according to the supplied control parameter.

In step S111, the parameter acquisition unit 403 acquires a state parameter relating to the piece of equipment 2. Thereby, the state parameter after variation according as the piece of equipment 2 has been operated by the decided control parameter is acquired. Note that, when the simulation is performed in step S109, the parameter acquisition unit 403 may acquire the state parameter from the simulator 431.

In step S113, the second learning processing unit 413 calculates a reward value, based on the acquired parameter.

The second learning processing unit 413 may calculate the reward value by using the reward function decided in step S103.

In step S115, the second learning processing unit 413 determines whether the acquisition processing of the parameter corresponding to the decision of the control parameter has exceeded a designated number of steps. Note that, the number of such steps may be designated in advance by the operator, or may be determined based on a learning object period (for example, 10 days, or the like). When it is determined that the above-described processing has not exceeded the designated number of steps (step S115: No), the second learning processing unit 413 returns the processing to step S107 and continues the flow. Thereby, the acquisition processing of the state parameter corresponding to the decision of the control parameter is executed by the designated number of steps.

When it is determined in step S115 that the above-described processing has exceeded the designated number of steps (step S115: Yes), the second learning processing unit 413 advances the processing to step S117. In step S117, the second learning processing unit 413 updates the operation model 401. For example, the second learning processing unit 413 adds new sample data, which has not been saved so far, to the operation model 401, in addition to overwriting the value of the weight column in the operation model shown in FIG. 2.

In step S119, the second learning processing unit 413 determines whether the acquisition processing of the operation model 401 has exceeded a designated number of repetition times. Note that, the number of such repetition times may be designated in advance by the operator, or may be determined corresponding to validity of the operation model 401. When it is determined that the above-described processing has not exceeded the designated number of repetition times (step S119: No), the second learning processing unit 413 returns the processing to step S105 and continues the flow.

When it is determined in step S119 that the above-described processing has exceeded the designated number of repetition times (step S119: Yes), the second learning processing unit 413 ends the flow. The second learning processing unit 413 can generate the operation model 401 that outputs the control parameter corresponding to the state parameter relating to the piece of equipment 2, in this way, for example.

[3.2. Other Learning Operations of Operation Model 401]

Figure 5:
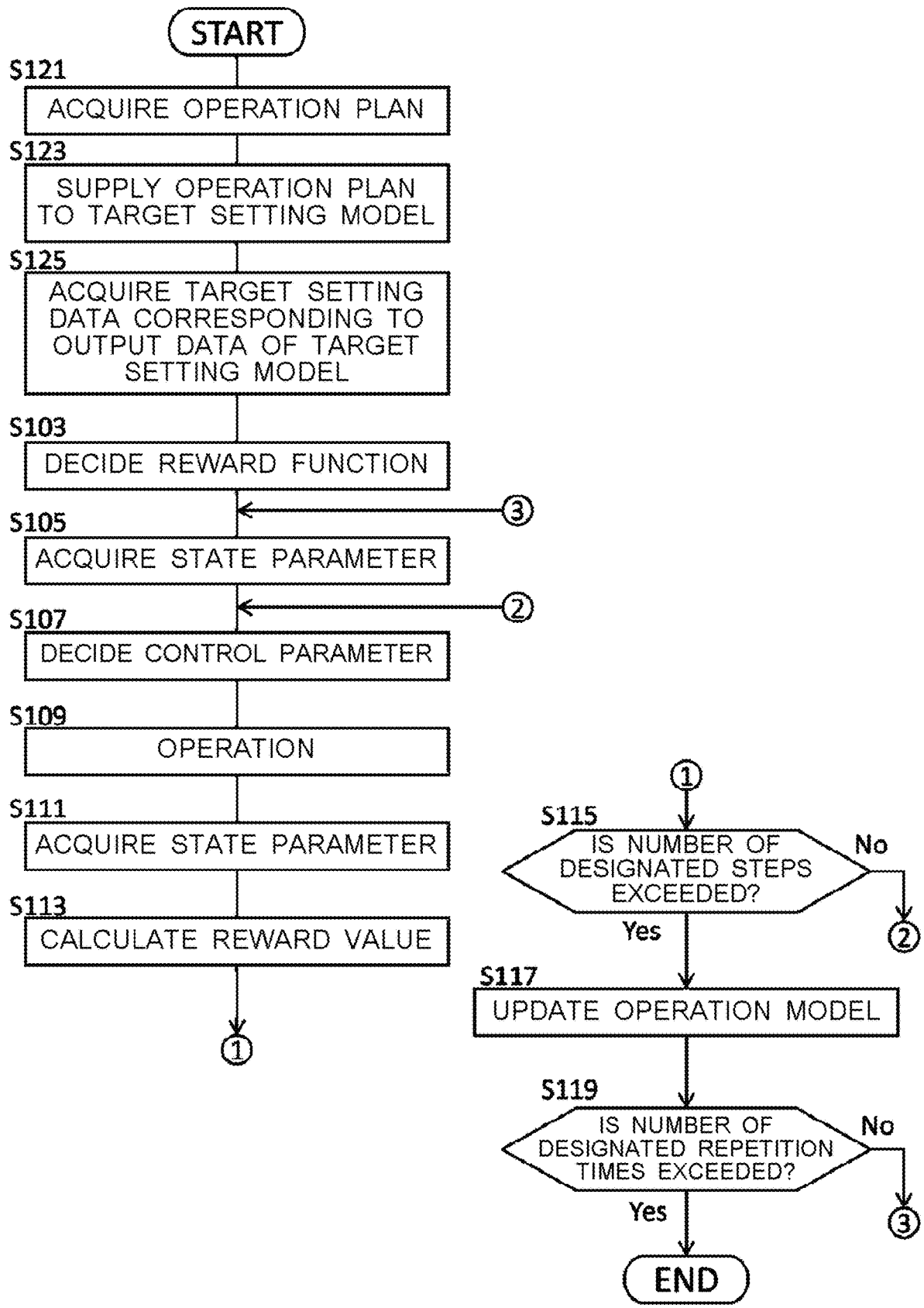
FIG. 5 shows another learning operation of the operation model 401.

FIG. 5 shows another learning operation of the operation model 401. When the learning processing of the target setting model 414 is completed, the apparatus 4 may generate the operation model 401 by processing of steps S121 to S123 and S103 to S119.

In step S121, the first supply unit 415 acquires an operation plan input newly. The first supply unit 415 may acquire an operation plan newly input to the input unit 411.

In step S123, the first supply unit 415 supplies the acquired operation plan to the target setting model 414. Thereby, in response to a new operation plan being input, the operation plan is supplied to the target setting model 414.

In step S125, the second supply unit 417 acquires output data from the target setting model (in the present embodiment, as an example, identification information and target range of a parameter), and acquires target setting data corresponding to the output data. The second supply unit 417 may acquire the output data, as it is, as the target setting data.

Instead of this, the second supply unit 417 may cause the display control unit 432 to display a content of the acquired output data as recommended target setting data, and acquire the target setting data that is input by the operator based on the displayed content. As an example, when a content of the output data in which the target range is 1 to 10 for a certain parameter is displayed and the operator inputs 2 to 9 as the target range of the parameter, the second supply unit 417 may acquire the target setting data in which the target range for the parameter is 2 to 9.

Thereafter, similar to steps S103 to S119 described above, the learning operation of the operation model 401 may be performed.

[3.3. Learning Operation of Target Setting Model 414]

Figure 6:
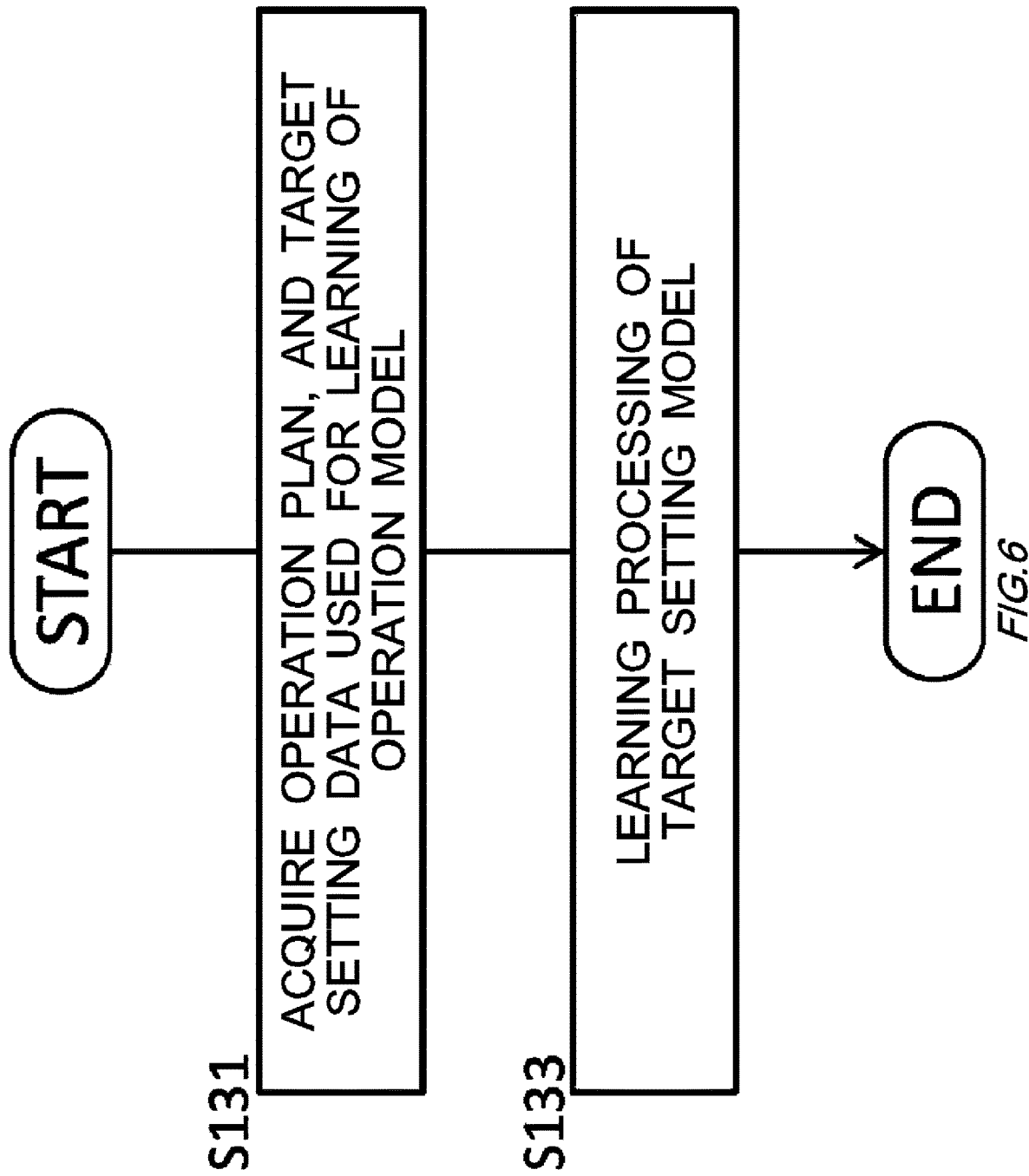
FIG. 6 shows a learning operation of a target setting model 414.

FIG. 6 shows a learning operation of the target setting model 414. The apparatus 4 may generate the target setting model 414 by processing of steps S131 to S133.

In step S131, the first acquisition unit 421 acquires an operation plan of the piece of equipment 2, and at least identification information of a parameter among the target setting data used for learning of the operation model 401. In the present embodiment, as an example, the first acquisition unit 421 may acquire at least the identification information of the parameter among the target setting data used for learning of the operation model 401, and the operation plan input by the input unit 411 in association with the target setting data. In addition, the first acquisition unit 421 may acquire both the identification information and the target range of the parameter among the target setting data. The first acquisition unit 421 may acquire the identification information of the parameter in the target setting data, the operation plan and the like from the storage unit 412.

In step S133, the first learning processing unit 422 performs learning processing of the target setting model 414 by using learning data including the identification information of the parameter and the operation plan acquired by the first acquisition unit 421. The first learning processing unit 422 may perform the learning processing of the target setting model 414 by supervised learning such as deep learning, or may perform the learning processing of the target setting model 414 so that a content of the output data from the target setting model 414 approximates a content of the target setting data used for learning of the operation model 401. In addition, in the present embodiment, as an example, the first learning processing unit 422 may perform, in response to an operation plan being input, learning processing for the target setting model 414 so as to output the content of the target setting data, which should be used for learning of the operation model 401 so as to implement the operation plan.

[3.4. Evaluation Operation of Operation Model 401]

Figure 7:
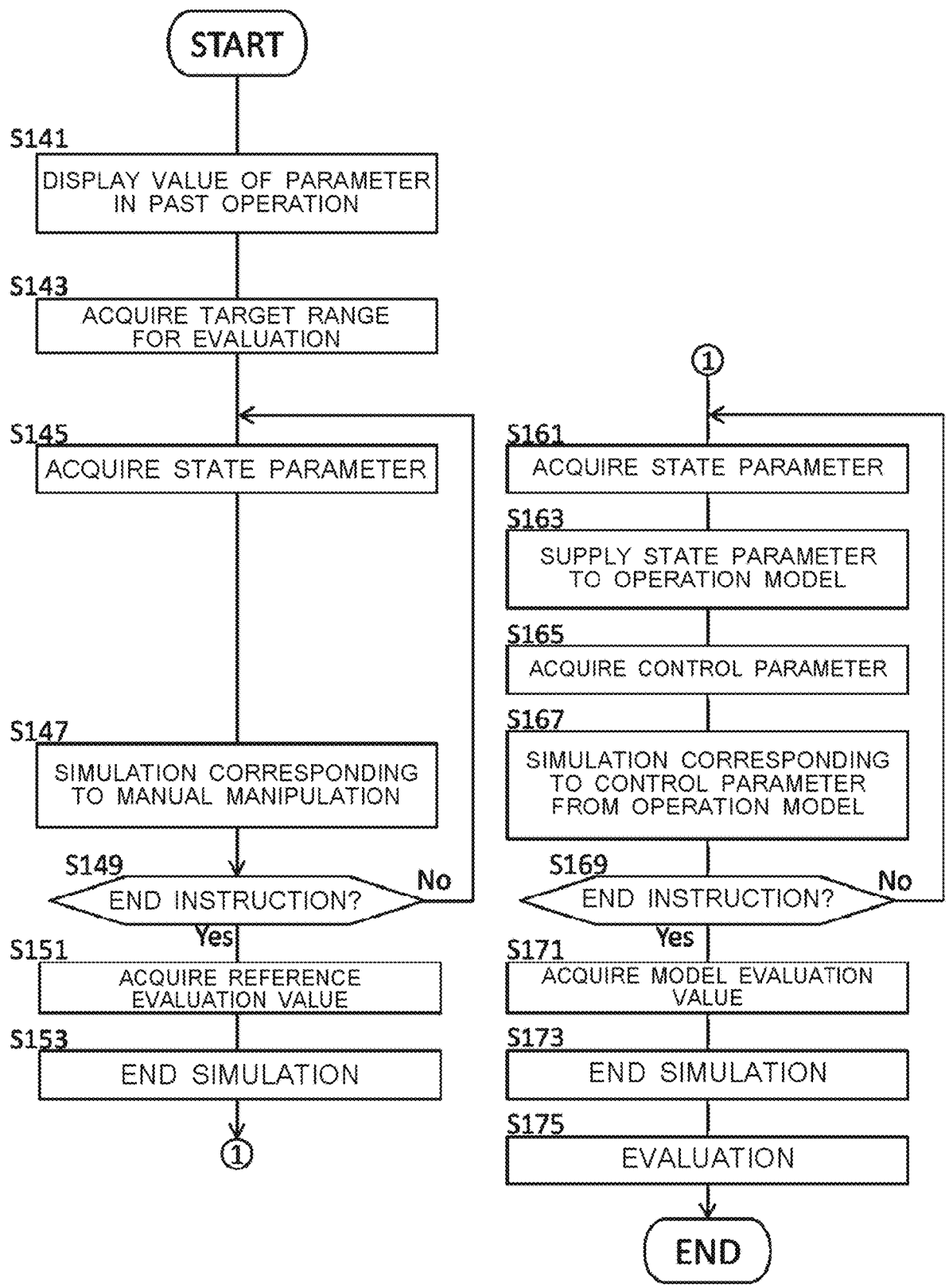
FIG. 7 shows an evaluation operation of the operation model 401.

FIG. 7 shows an evaluation operation of the operation model 401. The apparatus 4 may evaluate the generated operation model 401 by processing of steps S141 to S175.

In step S141, the display control unit 432 causes, in response to any of a plurality of types of parameters relating to the piece of equipment 2 being selected as a selection parameter by an operator, a value of the selection parameter in a past operation of the piece of equipment 2 to be displayed. For example, the display control unit 432 may cause the value of each selection parameter in the past operation of the piece of equipment 2 to be displayed in the coordinate space in which each selection parameter is set as a coordinate axis. As an example, the display control unit 432 may cause the value of each selection parameter in the past operation of the piece of equipment 2 to be displayed, respectively, or cause the maximum and minimum values of the value of each selection parameter in the past operation of the piece of equipment 2 to be displayed, thereby causing a range of the value of each selection parameter to be displayed.

In step S143, the target range acquisition unit 433 acquires a target range for evaluation set by the operator, with respect to the selection parameter. The target range acquisition unit 433 may acquire, in response to a range designation being performed in the coordinate space in which each selection parameter displayed by the display control unit 432 is set as a coordinate axis, the designated range, as the target range for evaluation.

In step S145, the state parameter acquisition unit 403 acquires a state parameter relating to the piece of equipment 2 from the simulator 431. Note that, when the processing of step S145 is executed first, the state of the piece of equipment 2 may be a preset initial state.

In step S147, the simulator 431 performs a simulation corresponding to a manipulation by a human. The simulator 431 may simulate a state of the piece of equipment 2 operated based on a control parameter corresponding to the manipulation by a human.

In step S149, the simulator 431 determines whether an end of the simulation has been instructed. For example, the simulator 431 may determine whether an end instruction of the simulation has been input via the input unit 411. When it is determined in step S149 that an end of the simulation has not been instructed (step S149: No), the processing may proceed to step S145 described above. When it is determined in step S149 that an end of the simulation has been instructed (step S149: Yes), the processing may proceed to step S151.

In step S151, the evaluation value acquisition unit 434 acquires a reference evaluation value corresponding to a result of having operated the piece of equipment 2 through the manipulation by a human. In the present embodiment, as an example, the reference evaluation value may be calculated based on a result of having input the manipulation by a human to the simulator 431.

The reference evaluation value may be calculated based on whether the parameter relating to the piece of equipment 2 operated by the control parameter corresponding to the manipulation by a human falls within the target range for evaluation. In a case where the target range for evaluation is set for each of a plurality of parameters relating to the piece of equipment 2, the reference evaluation value may be calculated based on a ratio (b/a) of a number of parameters (b), which fall within the corresponding target range, to a number of parameters (a) for which the target range for evaluation is set. Note that, the reference evaluation value may be calculated by the simulator 431, or may be calculated by the evaluation value acquisition unit 434 having acquired the parameter relating to the operated equipment 2 from the simulator 431.

In step S153, the simulator 431 ends the simulation corresponding to the manipulation by a human. The completion of the simulation may reset the simulated state of the piece of equipment 2 to the initial state.

In step S161, the state parameter acquisition unit 403 acquires the state parameter relating to the piece of equipment 2 from the simulator 431. Note that, when the processing of step S161 is executed first, the state of the piece of equipment 2 may be a preset initial state.

In step S163, the parameter acquisition unit 403 supplies the acquired state parameter to the operation model 401. Thereby, a recommendation value of the control parameter is output from the operation model 401.

In step S165, the operation unit 402 acquires the recommendation value of the control parameter output from the operation model 401.

In step S167, the simulator 431 performs a simulation corresponding to the recommendation value of the control parameter from the operation model 401. The simulator 431 may simulate a state of the piece of equipment 2 operated based on the recommendation value of the control parameter.

In step S169, the simulator 431 determines whether an end of the simulation has been instructed. When it is determined in step S169 that an end of the simulation has not been instructed (step S169: No), the processing may proceed to step S161 described above. When it is determined in step S169 that an end of the simulation has been instructed (step S169: Yes), the processing may proceed to step S171.

In step S171, the evaluation value acquisition unit 434 acquires a model evaluation value corresponding to a result of having operated the piece of equipment 2 by the recommendation value of the control parameter. In the present embodiment, as an example, the model evaluation value may be calculated based on a result of having input the recommendation value acquired by the operation unit 402 to the simulator 431 of the piece of equipment 2. Similar to the reference evaluation value, the model evaluation value may be calculated based on whether the parameter relating to the piece of equipment 2 operated by the recommendation value of the control parameter falls within the target range for evaluation.

In step S173, the simulator 431 ends the simulation corresponding to the recommendation value of the control parameter. The completion of the simulation may reset the simulated state of the piece of equipment 2 to the initial state.

In step S175, the evaluation unit 435 evaluates the operation model 401, based on the model evaluation value and the reference evaluation value. In the present embodiment, as an example, when the model evaluation value is larger than the reference evaluation value, the evaluation unit 435 may perform evaluation to the effect that the operation model 401 is favorable.

According to the above operation, since the reference evaluation value is calculated based on the result of having input the manipulation by a human to the simulator 431 of the piece of equipment 2, it is possible to quickly obtain the reference evaluation value without actually operating the piece of equipment 2.

In addition, since the model evaluation value is calculated based on the result of having input the recommendation value of the control parameter acquired from the operation model 401 to the simulator 431 of the piece of equipment 2, it is possible to quickly obtain the model evaluation value without actually operating the piece of equipment 2.

Further, since the reference evaluation value and the model evaluation value are calculated based on the result of the simulation, respectively, it is possible to set the piece of equipment 2 before operation to the same state, when operating the piece of equipment 2 through the manipulation by a human and when operating the piece of equipment 2 by using the operation model 401. Therefore, it is possible to accurately judge whether an operation result by using the operation model 401 is good or bad.

Further, when setting the target range for evaluation, since the value of each selection parameter in the past operation of the piece of equipment 2 is displayed in the coordinate space in which each selection parameter selected by the operator is set as a coordinate axis, it is possible to facilitate grasping of the past value of the selection parameter and a range thereof and to facilitate the setting of the target range for evaluation.

[3.5. Operational Operation of Equipment 2]

Figure 8:
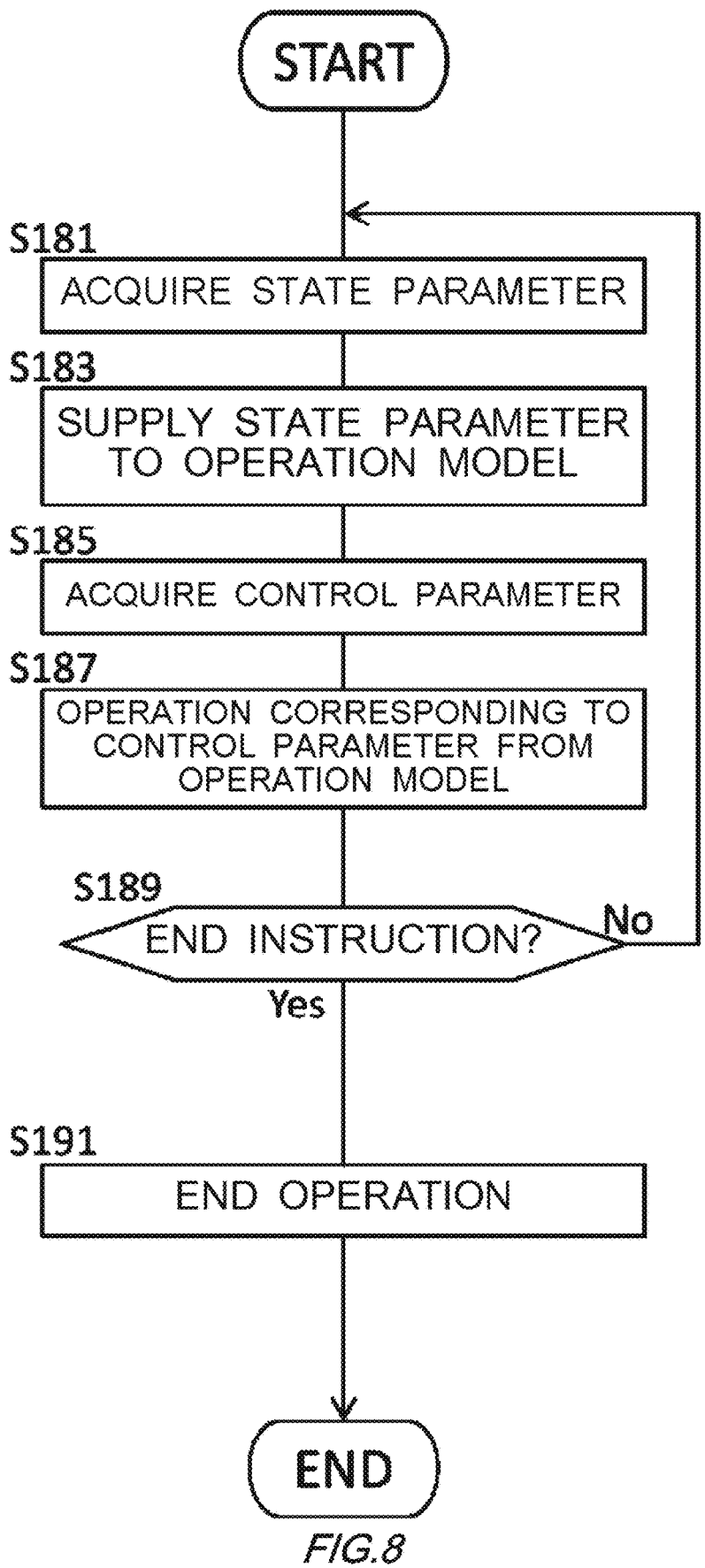
FIG. 8 shows an operational operation of a piece of equipment 2.

FIG. 8 shows an operational operation of the piece of equipment 2. The apparatus 4 may operate the piece of equipment 2 by processing of steps S181 to S191.

In step S181, the state parameter acquisition unit 403 acquires a state parameter relating to the piece of equipment 2. In step S183, the parameter acquisition unit 403 supplies the acquired state parameter to the operation model 401. Thereby, a recommendation value of the control parameter is output from the operation model 401. In step S185, the operation unit 402 acquires the recommendation value of the control parameter output from the operation model 401. In step S187, the operation unit 402 operates the piece of equipment 2 according to the recommendation value of the control parameter from the operation model 401.

In step S189, the operation unit 402 determines whether an end of the operation has been instructed. When it is determined in step S189 that an end of the operation has not been instructed (step S189: No), the processing may proceed to step S181 described above. When it is determined in step S189 that an end of the operation has been instructed (step S189: Yes), the processing proceeds to step S191 and the operation unit 402 ends the operation of the piece of equipment 2.

4. Modified Embodiment (1) of Target Setting Model 414

Note that, in the above embodiment, it has been described that the target setting model 414 is subjected to learning processing by using the operation plan and the learning data including the identification information and the target range of the parameter in the target setting data used for learning of the operation model 401, and the target setting model 414 having been subjected to the learning processing outputs, in response to the input of the operation plan, the identification information and the target range of the parameter among the target setting data that should be used for learning of the operation model 401. However, the combination of the contents of the learning data, input data, and output data with respect to the target setting model 414 is not limited thereto.

For example, the target setting model 414 may be subjected to learning processing by using the operation plan and the learning data including the identification information of the parameter in the target setting data used for learning of the operation model 401, and may be configured to output, in response to the input of the operation plan, only the identification information of the parameter among the target setting data that should be used for learning of the operation model 401, without outputting the target range. The learning data may include both the identification information and the target range of the parameter in the target setting data used for learning of the operation model. The target setting model 414 may be configured to output identification information of a single parameter, or may be configured to output identification information of a plurality of parameters. When only the identification information of the parameter is output from the target setting model 414, the second supply unit 417 may be configured to cause the display control unit 432 to display the output identification information of each parameter, to acquire the target range input by the operator for each identification information of the parameter, and to generate and supply target setting data, which represents the identification information and the target range, to the second learning processing unit 413.

In addition, the target setting model 414 may be subjected to learning processing by using the operation plan and the learning data including the identification information and the target range of the parameter in the target setting data used for learning of the operation model 401, and may be configured to output, in response to inputs of the operation plan and the identification information of the parameter for which the target range should be set, only the target range relating to the parameter among the target setting data that should be used for learning of the operation model 401, without outputting the identification information of the parameter. In this case, the identification information of a single parameter for which a target range should be set may be input from the operator to the target setting model 414 via the input unit 411, and the target range of the single parameter may be output from the target setting model 414. Instead of this, the identification information of a plurality of parameters for which a target range should be set may be input from the operator to the target setting model 414 via the input unit 411, and the target range of each parameter may be output from the target setting model 414. The second supply unit 417 may be configured to generate and supply target setting data, which represents the identification information of each parameter input to the target setting model 414 and the target range of each parameter output from the target setting model 414, to the second learning processing unit 413.

5. Modified Embodiment (2) of Target Setting Model 414

In addition, in the above embodiment, the target setting model 414 has been described as a single model, but a plurality of models having different functions may be provided.

Figure 9:
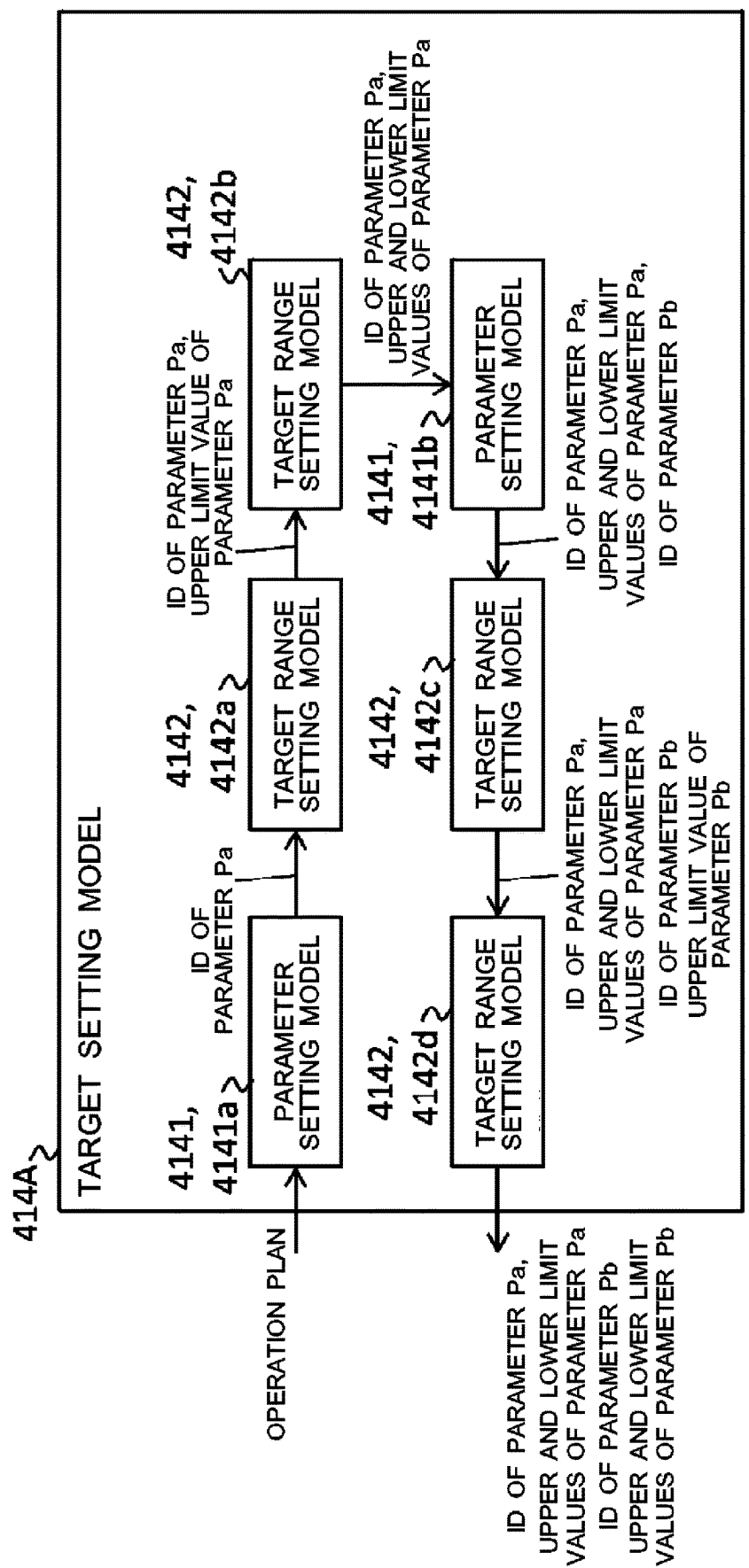
FIG. 9 shows a target setting model 414A according to a modified embodiment.

FIG. 9 shows a target setting model 414A according to the present modified embodiment. The target setting model 414A may include at least one parameter setting model 4141 and at least one target range setting model 4142. In the present embodiment, as an example, the target setting model 414A has two parameter setting models 4141a and 4141b and four target range setting models 4142a to 4142d. Each parameter setting model 4141 is configured to output identification information of a parameter for which a target range should be set, in response to an operation plan being input. Each target range setting model 4142 is configured to output, in response to an operation plan and identification information of a parameter for which a target range should be set being input, a target range that should be set for the parameter.

Among these, the parameter setting model 4141a may be configured to output identification information of a parameter (referred to as parameter Pa) for which a target range should be set, in response to an operation plan being input. In the present embodiment, as an example, the parameter setting model 4141a is configured to supply, in response to an operation plan being input from the first supply unit 415, the operation plan and the identification information of the parameter Pa to the target range setting model 4142a.

The target range setting model 4142a may be configured to output, in response to an operation plan and identification information of a parameter being input, an upper limit value of a target range that should be set for the parameter. In the present embodiment, as an example, the target range setting model 4142a is configured to supply, in response to the operation plan and the identification information of the parameter Pa being input from the parameter setting model 4141a to which the operation plan has been input by the first supply unit 415, the operation plan, the identification information of the parameter Pa, and an upper limit value $V_{PaMAX}$ of the target range of the parameter Pa to the target range setting model 4142b. Note that, the operation plan may be input directly to the target range setting model 4142a from the first supply unit 415, instead of being input to the target range setting model 4142a from the first supply unit 415 via the parameter setting model 4141a. The same applies to the target range setting models 4142b to 4142d and the parameter setting model 4141b, which will be described later.

The target range setting model 4142b may be configured to output, in response to the operation plan and the identification information of the parameter being input, a lower limit value of the target range that should be set for the parameter. In the present embodiment, as an example, the target range setting model 4142b is configured to supply, in response to the operation plan, the identification information of the parameter Pa and the upper limit value $V_{PaMAX}$ of the target range of the parameter Pa being input from the parameter setting model 4141a to which the operation plan has been input by the first supply unit 415, the operation plan, the identification information of the parameter Pa, and the upper and lower limit values $V_{PaMAX}$ and $V_{PaMIN}$ of the target range of the parameter Pa to the parameter setting model 4141b.

The parameter setting model 4141b may be configured to output, in response to the operation plan and the identification information of the parameter Pa for which a target range has been already set being input, identification information of another parameter (also referred to as a parameter Pb) for which a target range should be set. In the present embodiment, as an example, the parameter setting model 4141b is configured to supply, in response to the operation plan, the identification information of the parameter Pa, and the upper and lower limit values $V_{PaMAX}$ and $V_{PaMIN}$ of the target range being input from the target range setting model 4142b, the operation plan, the identification information and the upper and lower limit values $V_{PaMAX}$ and $V_{PaMIN}$ of the parameter Pa and the identification information of the parameter Pb different from the parameter Pa to the target range setting model 4142c.

The target range setting model 4142c may be configured to output, in response to the operation plan and the identification information of the parameter being input, an upper limit value of the target range that should be set for the parameter. In the present embodiment, as an example, the target range setting model 4142c is configured to supply, in response to the operation plan, the identification information and the upper and lower limit values $V_{PaMAX}$ and $V_{PaMIN}$ of the parameter Pa of the target range and the identification information of the parameter Pb being supplied from the parameter setting model 4141b, the operation plan, the identification information of the parameter Pa, the upper and lower limit values $V_{PaMAX}$ and $V_{PaMIN}$ of the target range of the parameter Pa, the identification information of the parameter Pb and the upper limit value $V_{PbMAX}$ of the target range of the parameter Pb to the target range setting model 4142d.

The target range setting model 4142d may be configured to output, in response to the operation plan and the identification information of the parameter being input, a lower limit value of the target range that should be set for the parameter. In the present embodiment, as an example, the target range setting model 4142d is configured to output, in response to the operation plan, the identification information and the upper and lower limit values $V_{PaMAX}$ and $V_{PaMIN}$ of the target range of the parameter Pa, the identification information of the parameter Pb and the upper limit value $V_{PbMAX}$ of the target range of the parameter Pb being supplied from the target range setting model 4142c, the operation plan, the identification information of the parameter Pa, the upper and lower limit values $V_{PaMAX}$ and $V_{PaMIN}$ of the target range of the parameter Pa, the identification information of the parameter Pb and the upper and lower limit values $V_{PbMAX}$ and $V_{PbMIN}$ of the target range of the parameter Pb.

According to the above target setting model 414A, in response to an operation plan being input to the parameter setting model 4141, the identification information of a parameter for which a target range should be set is output. Therefore, the parameter for which a target range is set can be matched with the parameter of the target setting data used for learning of the operation model 401.

In addition, in response to the operation plan and the identification information of the parameter Pa for which a target range has been already set being input to the parameter setting model 4141b, the identification information of the parameter Pb for which a target range should be set is output. Therefore, the parameter Pb for which a target range is set can be matched with the parameter used for the target setting data in the learning of the operation model 401 together with the parameter Pa.

Further, in response to the operation plan, the identification information and the upper and lower limit values $V_{PaMAX}$ and $V_{PaMIN}$ of the target range of the parameter Pa for which a target range has been already set being input to the parameter setting model 4141b, the identification information of the parameter Pb for which a target range should be set is output. Therefore, the parameter Pb for which a target range is set can be matched with the parameter used for the target setting data in the learning of the operation model 401 together with the identification information and the upper and lower limit values $V_{PaMAX}$ and $V_{PaMIN}$ of the parameter Pa.

Further, in response to the operation plan and the identification information of the parameters Pa and Pb for which target ranges should be set being input to the target range setting model 4142, the target ranges that should be set for the parameters Pa and Pb are output. Therefore, the target ranges that should be set for the parameters Pa and Pb can be matched with the target range of the target setting data used in the learning of the operation model 401.

Further, in response to the operation plan being input to the parameter setting model 4141a, the identification information of the parameter Pa for which a target range should be set is output from the parameter setting model 4141a and the operation plan is input to the target range setting model 4142a, and in response to the identification information of the parameter Pa being input from the parameter setting model 4141, the target range $V_{PaMAX}$, $V_{PaMIN}$ that should be set for the parameter Pa is output from the target range setting model 4142a. Therefore, the parameter and the target range of the target setting data can be sequentially and automatically acquired.

Note that, the parameter setting model 4141a of the target setting model 414A may be subjected to learning processing by the first learning processing unit 422 by using the learning data including the identification information of the parameter acquired by the first acquisition unit 421 and the operation plan. Thereby, since the target range of a parameter can be omitted in the learning data for learning the parameter setting model 4141a, the learning processing can be facilitated.

Further, the parameter setting model 4141b and the target range setting models 4142a to 4142d may be subjected to learning processing by the first learning processing unit 422 by using the learning data including the identification information and the target range of the parameter acquired by the first acquisition unit 421 and the operation plan. Thereby, the content of the output data from a model can be approximated to the content of the target setting data used for learning of the operation model 401, so as to implement the operation plan.

6. Other Modified Embodiments

Note that, in the above embodiment, the apparatus 4 has been described as including the operation model 401 and the target setting model 414, but may not include any of them. When the apparatus 4 does not have the operation model 401 and the target setting model 414, the apparatus may be configured to perform the learning processing for the operation model 401 and the target setting model 414 in an externally connected storage apparatus, may be configured to perform evaluation for the operation model 401 in the externally connected storage apparatus, and may be configured to perform an operation by using the operation model 401 in the externally connected storage apparatus.

In addition, the apparatus 4 has been described as including the first acquisition unit 421, the first learning processing unit 422 and the like so as to perform the learning processing of the target setting model 414, but the apparatus may not include the same. In this case, the apparatus 4 may be configured to perform the learning processing of the operation model 401 by using the target setting model 414 for which learning has been completed. The target setting model 414 for which learning has been completed may be shared by a plurality of apparatuses 4, and the learning processing of the operation model 401 may be separately performed in each apparatus 4.

Further, the apparatus 4 has been described as including the second learning processing unit 413 and the like so as to perform the learning processing of the operation model 401, but the apparatus may not include the same. In this case, the apparatus 4 may be configured to acquire, from an outside, the identification information and the like of the parameter in the target setting data used for the learning of the operation model 401, and to perform the learning processing of the target setting model 414.

Further, the evaluation value acquisition unit 434 has been described as acquiring the reference evaluation value and model evaluation value corresponding to the simulation result, but the evaluation value acquisition unit may be configured to acquire the reference evaluation value and model evaluation value corresponding to a result of having actually operated the piece of equipment 2.

Further, the reference evaluation value has been described as being calculated by the evaluation value acquisition unit 434, but the reference evaluation value may be stored in advance in the apparatus 4, as a fixed value.

In addition, various embodiments of the present invention may be described with reference to flowcharts and block diagrams, wherein the block may serve as (1) a stage in a process in which an operation is performed, or (2) a section of an apparatus having a role of performing an operation. Certain stages and sections may be implemented by dedicated circuitry, programmable circuitry provided with computer readable instructions stored on a computer readable medium, and/or a processor provided with computer readable instructions stored on a computer readable medium. The dedicated circuitry may include digital and/or analog hardware circuits, and may include integrated circuits (ICs) and/or discrete circuits. The programmable circuitry may include reconfigurable hardware circuits including memory elements such as logic AND, logic OR, logic XOR, logic NAND, logic NOR, and other logic operations, flip-flops, registers, field programmable gate arrays (FPGA), programmable logic arrays (PLA), and the like.

The computer readable medium may include any tangible device capable of storing instructions for execution by a suitable device, so that the computer readable medium having the instructions stored therein will have a product including instructions that can be executed to create means for performing the operations designated in flowcharts or block diagrams. Examples of the computer readable medium may include an electronic storage medium, a magnetic storage medium, an optical storage medium, an electromagnetic storage medium, a semiconductor storage medium, and the like. More detailed examples of the computer readable medium may include a floppy (registered trademark) disk, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a compact disc read-only memory (CD-ROM), a digital versatile disk (DVD), a BLU-RAY (registered trademark) disc, a memory stick, an integrated circuit card, etc.

Computer readable instructions may include assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk (registered trademark), JAVA (registered trademark), C++, etc., and conventional procedural programming languages, such as the "C" programming language or similar programming languages.

Computer readable instructions may be provided to a processor of a general purpose computer, special purpose computer, or other programmable data processing apparatus, or to programmable circuitry, locally or via a local area network (LAN), wide area network (WAN) such as the Internet, etc., so that the processor of the general purpose computer, special purpose computer, or other programmable data processing apparatus, or the programmable circuitry executes the computer readable instructions to create means for performing operations specified in the flowcharts or block diagrams. Examples of the processor include a computer processor, a processing unit, a microprocessor, a digital signal processor, a controller, a microcontroller, and the like.

Figure 10:
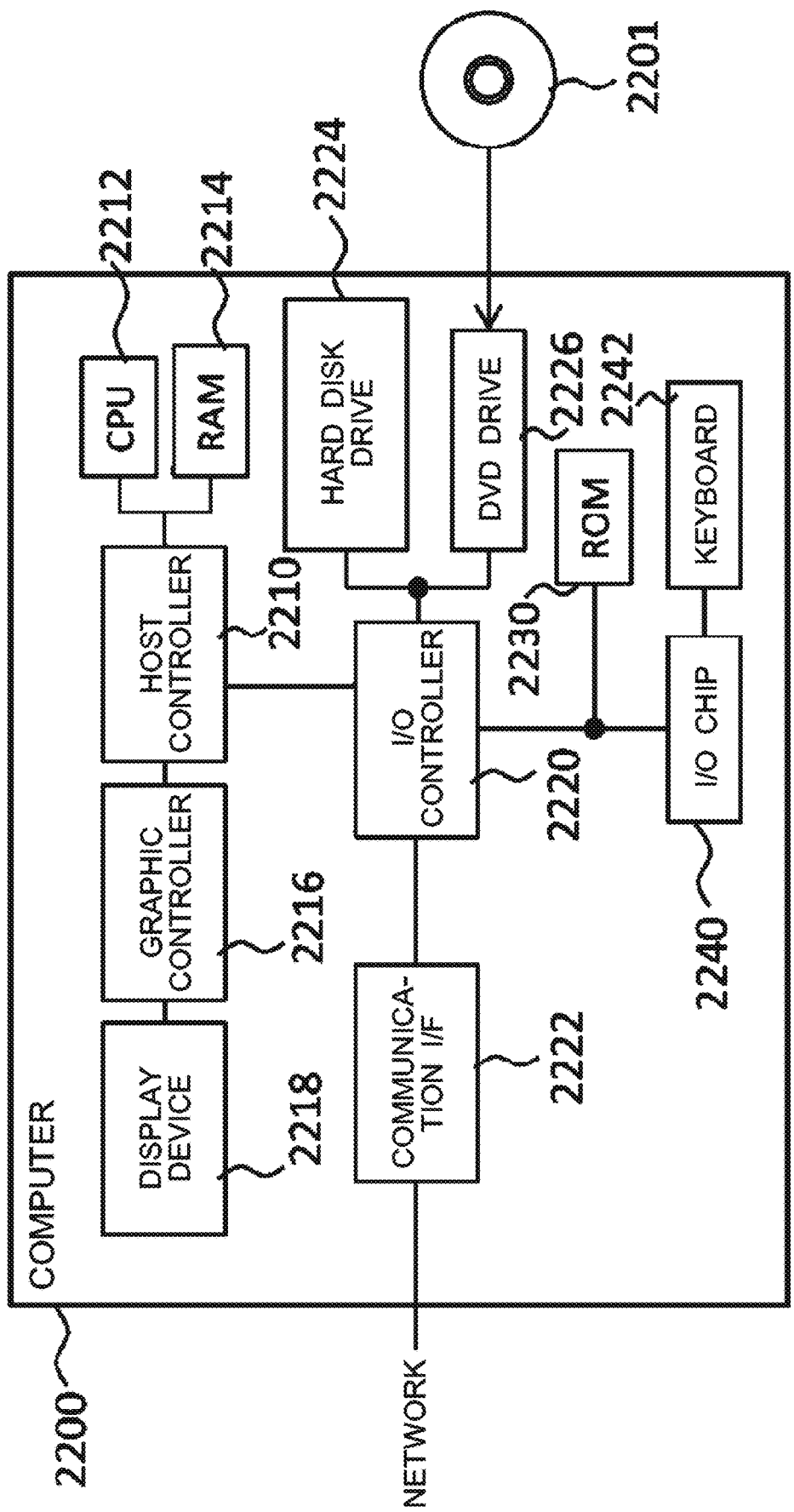
FIG. 10 shows an example of a computer 2200 in which a plurality of aspects of the present invention may be embodied in whole or in part.

FIG. 10 shows an example of a computer 2200 in which a plurality of embodiments of the present invention may be embodied in whole or in part. A program installed in the computer 2200 may cause the computer 2200 to function as an operation associated with the apparatuses according to the embodiments of the present invention or as one or more sections of the apparatuses, or may cause the operation or the one or more sections to be executed, and/or may cause the computer 2200 to execute a process according to the embodiments of the present invention or a stage of the process. Such programs may be executed by a CPU 2212 to cause the computer 2200 to perform certain operations associated with some or all of the blocks in the flowcharts and block diagrams described in the present specification.

The computer 2200 according to the present embodiment includes the CPU 2212, a RAM 2214, a graphic controller 2216, and a display device 2218, which are interconnected by a host controller 2210. The computer 2200 further includes input/output units such as a communication interface 2222, a hard disk drive 2224, a DVD-ROM drive 2226, and an IC card drive, which are connected to the host controller 2210 via an input/output controller 2220. The computer also includes legacy input/output units such as a ROM 2230 and a keyboard 2242, which are connected to the input/output controller 2220 via an input/output chip 2240.

The CPU 2212 operates according to programs stored in the ROM 2230 and the RAM 2214, thereby controlling each unit. The graphic controller 2216 acquires image data generated by the CPU 2212 in a frame buffer or the like provided in the RAM 2214 or in itself, such that the image data is displayed on the display device 2218.

The communication interface 2222 communicates with other electronic devices via a network. The hard disk drive 2224 stores programs and data used by the CPU 2212 within the computer 2200. The DVD-ROM drive 2226 reads a program or data from the DVD-ROM 2201 and provides the program or data to the hard disk drive 2224 via the RAM 2214. The IC card drive reads programs and data from the IC card, and/or writes programs and data to the IC card.

The ROM 2230 stores therein boot programs and the like executed by the computer 2200 at the time of activation, and/or programs that depend on the hardware of the computer 2200. The input/output chip 2240 may also connect various input/output units to the input/output controller 2220 via a parallel port, a serial port, a keyboard port, a mouse port, or the like.

A program is provided by a computer readable medium such as the DVD-ROM 2201 or the IC card. The program is read from the computer readable medium, installed into the hard disk drive 2224, RAM 2214, or ROM 2230, which are also examples of computer-readable media, and executed by the CPU 2212. Information processing written in these programs is read by the computer 2200, and provides cooperation between the programs and the various types of hardware resources described above. The apparatus or method may be configured by implementing operations or processing of information according to use of the computer 2200.

For example, in a case where communication is performed between the computer 2200 and an external device, the CPU 2212 may execute a communication program loaded in the RAM 2214 and instruct the communication interface 2222 to perform communication processing on the basis of a process described in the communication program. Under the control of the CPU 2212, the communication interface 2222 reads transmission data stored in a transmission buffer processing area provided in a recording medium such as the RAM 2214, the hard disk drive 2224, the DVD-ROM 2201, or the IC card, transmits the read transmission data to the network, or writes reception data received from the network in a reception buffer processing area or the like provided on the recording medium.

In addition, the CPU 2212 may cause the RAM 2214 to read all or a necessary part of a file or database stored in an external recording medium such as the hard disk drive 2224, the DVD-ROM drive 2226 (DVD-ROM 2201), the IC card, or the like, and may execute various types of processing on data on the RAM 2214. Then, the CPU 2212 writes the processed data back in the external recording medium.

Various types of information such as various types of programs, data, tables, and databases may be stored in a recording medium and subjected to information processing. The CPU 2212 may execute, on the data read from the RAM 2214, various types of processing including various types of operations, information processing, conditional judgement, conditional branching, unconditional branching, information retrieval/replacement, or the like described throughout the present disclosure and specified by instruction sequences of the programs, and writes the results back to the RAM 2214. Moreover, the CPU 2212 may retrieve information in a file, a database, or the like in the recording medium. For example, when a plurality of entries, each having an attribute value of a first attribute associated with an attribute value of a second attribute, are stored in the recording medium, the CPU 2212 may retrieve, out of said plurality of entries, an entry with the attribute value of the first attribute specified that meets a condition, read the attribute value of the second attribute stored in said entry, and thereby obtain the attribute value of the second attribute associated with the first attribute meeting a predetermined condition.

The programs or software modules described above may be stored in a computer readable medium on or near the computer 2200. In addition, a recording medium such as a hard disk or a RAM provided in a server system connected to a dedicated communication network or the Internet can be used as a computer readable medium, thereby providing a program to the computer 2200 via the network.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

1: system
2: Equipment
4: apparatus
401: operation model
402: operation unit
403: parameter acquisition unit
411: input unit
412: storage unit
413: second learning processing unit
414: target setting model
415: first supply unit
416: second acquisition unit
417: second supply unit
421: first acquisition unit
422: first learning processing unit
431: simulator
432: display control unit
433: target range acquisition unit
434: evaluation value acquisition unit
435: evaluation unit
2200: computer
2201: DVD-ROM
2210: host controller
2212: CPU
2214: RAM
2216: graphic controller
2218: display device
2220: input/output controller
2222: communication interface
2224: hard disk drive
2226: DVD-ROM drive
2230: ROM
2240: input/output chip
2242: keyboard
4141: parameter setting model
4142: target range setting model

What is claimed is:

1. An apparatus comprising at least one processor, wherein:
the at least one processor supplies a value of a state parameter to an operation model configured to output a recommendation value of a control parameter of a piece of equipment in response to a value of a state parameter relating to the piece of equipment being input;
the at least one processor acquires the recommendation value of the control parameter that is output from the operation model in response to the at least one processor supplying a value of a state parameter to the operation model;
the at least one processor acquires a model evaluation value corresponding to a result of having operated the piece of equipment according to the recommendation value acquired by the at least one processor; and
the at least one processor evaluates the operation model based on the model evaluation value and a reference evaluation value,
wherein the reference evaluation value relates to a result of the piece of equipment being operated using the control parameters chosen through a manipulation by a human.

2. The apparatus according to claim 1, wherein
the reference evaluation value is calculated based on a result of having input a manipulation by a human to a simulator of the piece of equipment.

3. The apparatus according to claim 2, wherein
the model evaluation value is calculated based on a result of having input the recommendation value acquired by the at least one processor to a simulator of the piece of equipment.

4. The apparatus according to claim 2, wherein
the model evaluation value is calculated based on whether a parameter relating to the piece of equipment operated according to the recommendation value falls within a target range, and
the reference evaluation value is calculated based on whether a parameter relating to the piece of equipment operated through a manipulation by a human falls within the target range.

5. The apparatus according to claim 2, wherein the at least one processor executes learning processing of the operation model by using learning data including a value of a state parameter and a value of a control parameter.

6. The apparatus according to claim 1, wherein
the model evaluation value is calculated based on a result of having input the recommendation value acquired by the at least one processor to a simulator of the piece of equipment.

7. The apparatus according to claim 6, wherein
the model evaluation value is calculated based on whether a parameter relating to the piece of equipment operated according to the recommendation value falls within a target range, and
the reference evaluation value is calculated based on whether a parameter relating to the piece of equipment operated through a manipulation by a human falls within the target range.

8. The apparatus according to claim 6, wherein the at least one processor executes learning processing of the operation model by using learning data including a value of a state parameter and a value of a control parameter.

9. The apparatus according to claim 1, wherein
the model evaluation value is calculated based on whether a parameter relating to the piece of equipment operated according to the recommendation value falls within a target range, and
the reference evaluation value is calculated based on whether a parameter relating to the piece of equipment operated through a manipulation by a human falls within the target range.

10. The apparatus according to claim 9, wherein the at least one processor acquires the target range set by an operator with respect to a selection parameter selected by the operator among a plurality of types of parameters relating to the piece of equipment.

11. The apparatus according to claim 10, wherein the at least one processor causes, in response to the selection parameter being selected from the plurality of types of parameters, a value of the selection parameter in a past operation of the piece of equipment to be displayed.

12. The apparatus according to claim 11, wherein
the at least one processor causes a value of each selection parameter in the past operation of the piece of equipment to be displayed in a coordinate space in which each selection parameter is set as a coordinate axis.

13. The apparatus according to claim 12, wherein
the piece of equipment is a piece of equipment configured to manufacture an article, and
the parameter relating to the piece of equipment is at least one of an index value representing a quality of the article or a production volume of the article.

14. The apparatus according to claim 11, wherein
the piece of equipment is a piece of equipment configured to manufacture an article, and
the parameter relating to the piece of equipment is at least one of an index value representing a quality of the article or a production volume of the article.

15. The apparatus according to claim 9, wherein
the piece of equipment is a piece of equipment configured to manufacture an article, and
the parameter relating to the piece of equipment is at least one of an index value representing a quality of the article or a production volume of the article.

16. The apparatus according to claim 10, wherein
the piece of equipment is a piece of equipment configured to manufacture an article, and
the parameter relating to the piece of equipment is at least one of an index value representing a quality of the article or a production volume of the article.

17. The apparatus according to claim 1, wherein the at least one processor executes learning processing of the operation model by using learning data including a value of a state parameter and a value of a control parameter.

18. The apparatus according to claim 17, wherein
the at least one processor executes the learning processing of the operation model by using the learning data and a reward value determined by a preset reward function.

19. A method comprising:
supplying a value of a state parameter to an operation model configured to output a recommendation value of a control parameter of a piece of equipment, in response to a value of a state parameter representing a state relating to the piece of equipment being input;
acquiring a control parameter by acquiring the recommendation value of the control parameter that is output from the operation model in response to supplying a value of a state parameter to the operation model by the supplying;
acquiring a model evaluation value corresponding to a result of having operated the piece of equipment according to the recommendation value acquired by the acquiring the recommendation value of the control parameter; and
evaluating the operation model based on the model evaluation value and a reference evaluation value,
wherein the reference evaluation value relates to a result of the piece of equipment being operated using the control parameters chosen through a manipulation by a human.

20. A non-transitory computer readable storage medium having recorded thereon a program configured to cause a computer to:
supply a value of a state parameter to an operation model configured to output a recommendation value of a control parameter of a piece of equipment in response to a value of a state parameter relating to the piece of equipment being input;
acquire the recommendation value of the control parameter that is output from the operation model in response to the computer supplying a value of a state parameter to the operation model;
acquire a model evaluation value corresponding to a result of having operated the piece of equipment according to the recommendation value acquired by the computer; and
evaluate the operation model based on the model evaluation value and a reference evaluation value,
wherein the reference evaluation value relates to a result of the piece of equipment being operated using the control parameters chosen through a manipulation by a human.

* * * * *